(12) United States Patent
Goda et al.

(10) Patent No.: US 10,356,264 B2
(45) Date of Patent: Jul. 16, 2019

(54) IMAGE READING APPARATUS AND PRINTING APPARATUS

(71) Applicant: CANON KABUSHIKI KAISHA, Tokyo (JP)

(72) Inventors: Junichi Goda, Kashiwa (JP); Daiki Ikari, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/465,901

(22) Filed: Mar. 22, 2017

(65) Prior Publication Data
US 2017/0289377 A1    Oct. 5, 2017

(30) Foreign Application Priority Data

Mar. 30, 2016    (JP) .................. 2016-069276

(51) Int. Cl.
| | | |
|---|---|---|
| H04N 1/00 | (2006.01) | |
| G06K 15/00 | (2006.01) | |
| G06K 15/02 | (2006.01) | |
| H04N 1/04 | (2006.01) | |

(52) U.S. Cl.
CPC ......... *H04N 1/00891* (2013.01); *G06K 15/02* (2013.01); *G06K 15/406* (2013.01); *G06K 15/4055* (2013.01); *H04N 1/00896* (2013.01)

(58) Field of Classification Search
CPC ........... H04N 1/00896; H04N 1/00885; H04N 1/32101; H04N 1/36; H04N 2201/0091; H04N 5/04; G06F 3/044; G06F 3/0412; G06F 1/3265; G06F 3/1423
USPC .......... 358/1.13, 1.14, 1.15; 348/333.13, 47; 709/227
See application file for complete search history.

(56) References Cited

U.S. PATENT DOCUMENTS

| | | | | |
|---|---|---|---|---|
| 5,808,286 A | * | 9/1998 | Nukui | G06K 7/10881 235/454 |
| 6,190,153 B1 | * | 2/2001 | Tsuzukiyama | B29C 55/143 264/40.1 |
| 9,137,442 B2 | * | 9/2015 | Shiohara | H04N 5/23235 |
| 9,557,790 B2 | * | 1/2017 | Yamaki | G11C 5/148 |
| 9,620,072 B2 | * | 4/2017 | Ben-Harrush | G06F 1/3218 |
| 2006/0233036 A1 | * | 10/2006 | Blodgett | G11C 7/1072 365/230.01 |
| 2007/0035650 A1 | * | 2/2007 | Suzuki | H04N 5/232 348/312 |
| 2007/0206211 A1 | * | 9/2007 | Okutsu | G03G 15/50 358/1.14 |
| 2008/0253786 A1 | * | 10/2008 | Isobe | G03G 15/5004 399/69 |
| 2008/0267464 A1 | * | 10/2008 | Goda | H04N 1/00474 382/124 |
| 2010/0091158 A1 | * | 4/2010 | Yamashita | H04N 5/353 348/300 |

(Continued)

FOREIGN PATENT DOCUMENTS

JP    2013-025843 A    2/2013

*Primary Examiner* — Negussie Worku
(74) *Attorney, Agent, or Firm* — Venable LLP

(57) ABSTRACT

An image reading apparatus, comprising a memory that can transition from a normal mode to a power saving mode based on an inputted control signal, and a control unit that controls the control signal based on a synchronization signal that indicates a timing at which an image processing module outputs image data to a reading unit or a print unit.

16 Claims, 24 Drawing Sheets

(56) References Cited

U.S. PATENT DOCUMENTS

| | | | |
|---|---|---|---|
| 2010/0272362 A1* | 10/2010 | Ohnishi | H04N 1/00374 382/187 |
| 2011/0243594 A1* | 10/2011 | Saito | G03G 15/5004 399/70 |
| 2012/0154859 A1* | 6/2012 | Goda | H04N 1/00244 358/1.15 |
| 2012/0229839 A1* | 9/2012 | Goda | G06K 15/4055 358/1.14 |
| 2013/0287122 A1* | 10/2013 | Mizosoe | H04N 21/2365 375/240.26 |
| 2013/0308642 A1* | 11/2013 | Kimura | H04L 47/25 370/392 |
| 2014/0002844 A1* | 1/2014 | Miyamoto | G06K 15/4055 358/1.13 |
| 2014/0160515 A1* | 6/2014 | Goda | H04N 1/00811 358/1.14 |
| 2015/0071669 A1* | 3/2015 | Goda | G03G 15/01 399/69 |
| 2015/0092084 A1* | 4/2015 | Lee | H04N 5/2256 348/234 |
| 2015/0212447 A1* | 7/2015 | Yagi | G03G 15/043 347/118 |
| 2015/0264217 A1* | 9/2015 | Goda | H04N 1/00891 358/1.13 |
| 2015/0319318 A1* | 11/2015 | Hashimoto | H04N 1/00244 358/473 |
| 2016/0036998 A1* | 2/2016 | Goda | H04N 1/00509 358/1.13 |
| 2016/0087617 A1* | 3/2016 | Niitsuma | H03K 5/135 327/115 |
| 2016/0087618 A1* | 3/2016 | Niitsuma | H03K 5/135 365/233.11 |
| 2016/0277618 A1* | 9/2016 | Horishita | H04N 1/00891 |
| 2017/0004798 A1* | 1/2017 | Park | G09G 3/3648 |
| 2017/0111535 A1* | 4/2017 | Morimoto | H04N 1/00896 |
| 2017/0289398 A1* | 10/2017 | Otani | H04N 1/401 |
| 2018/0210849 A1* | 7/2018 | Goda | G06F 13/1605 |

* cited by examiner

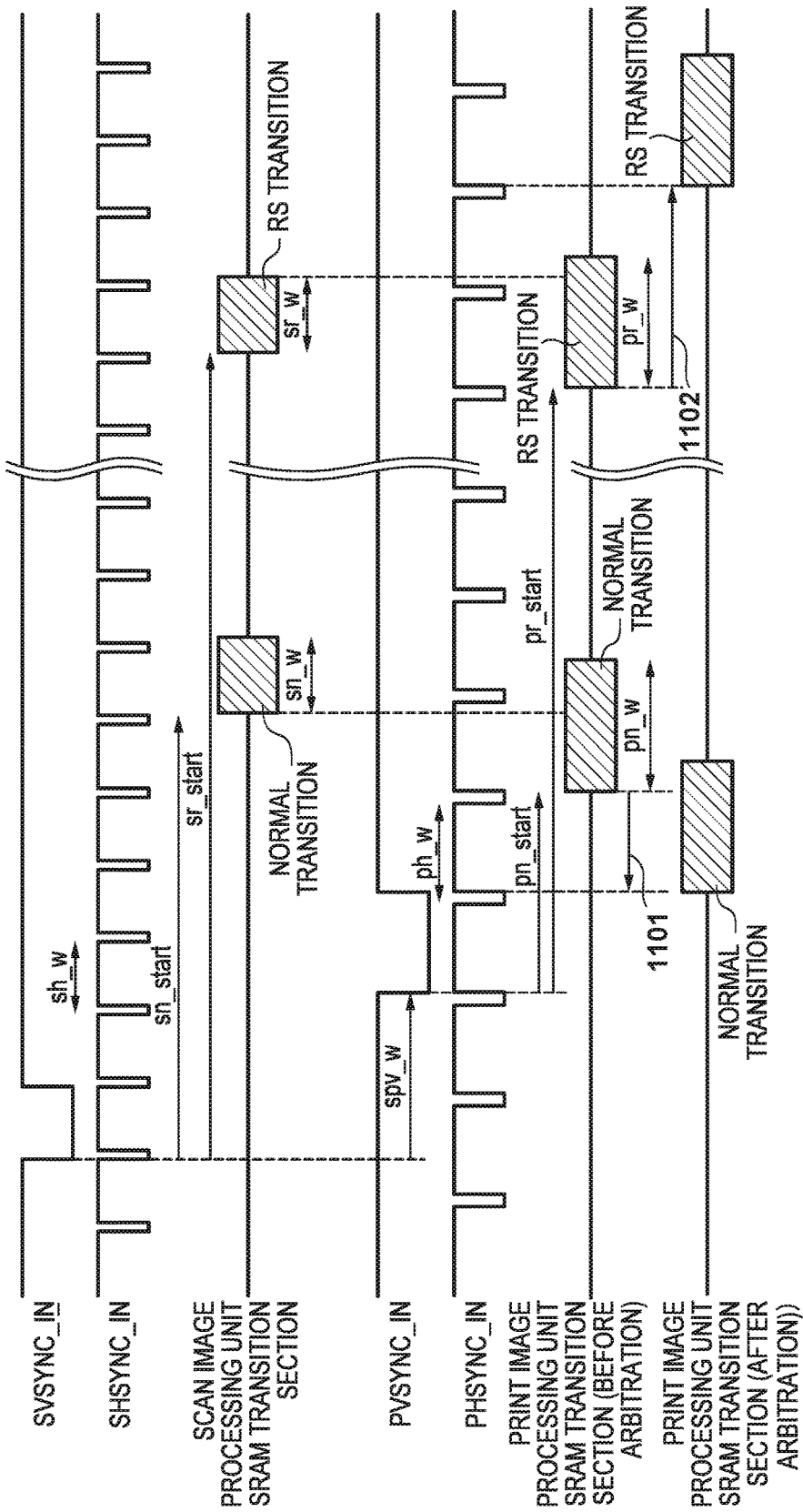

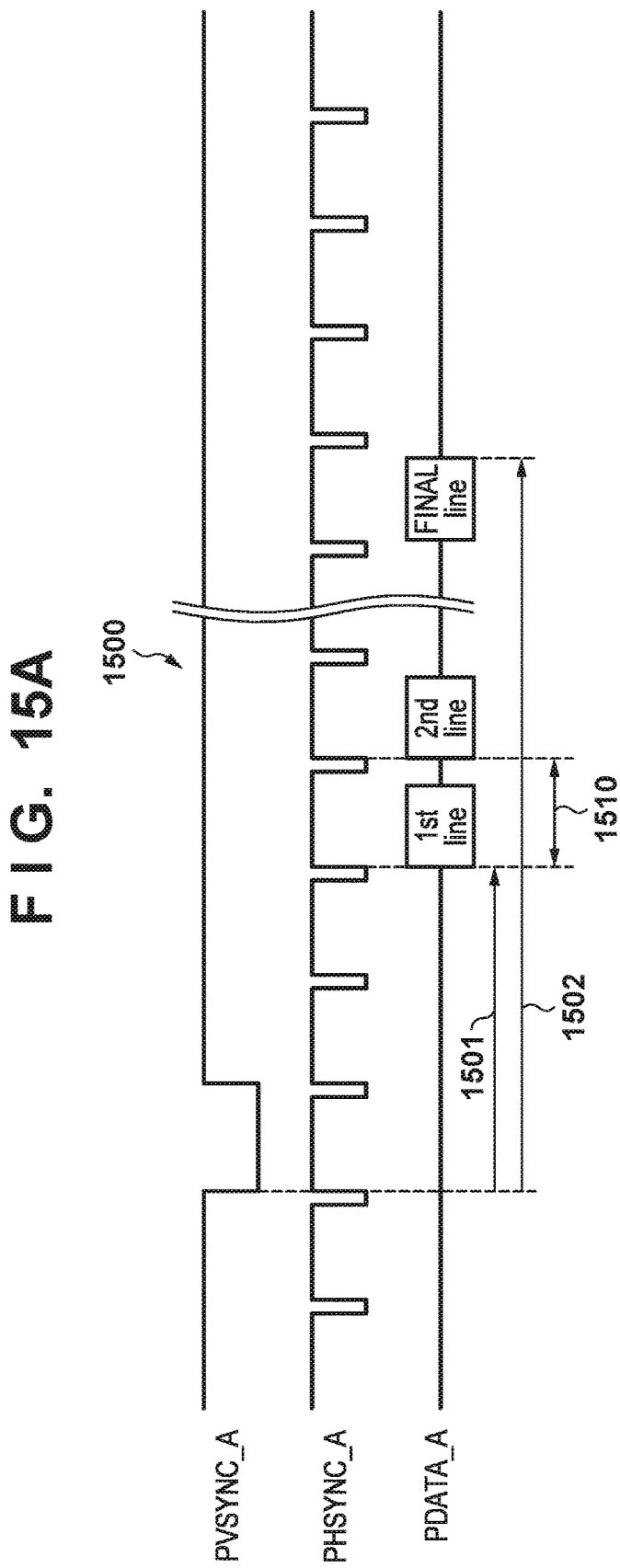

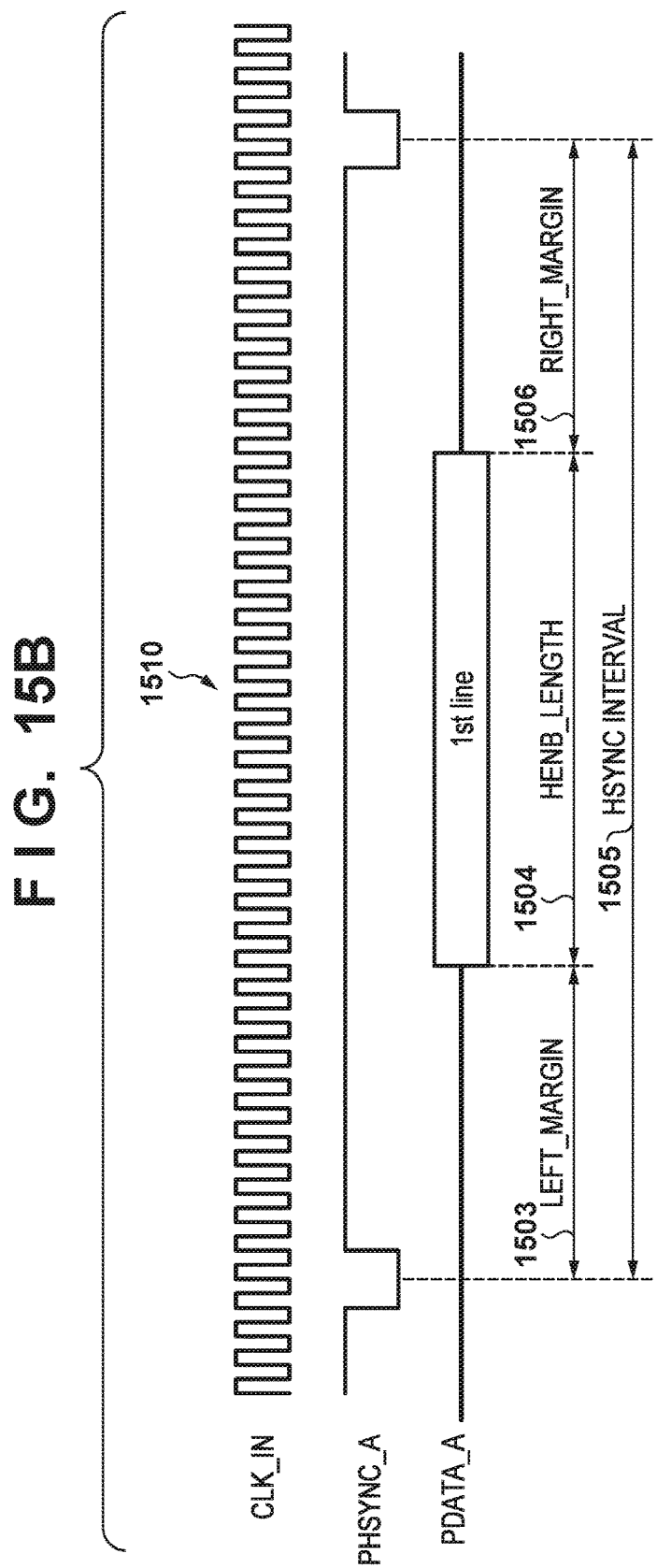

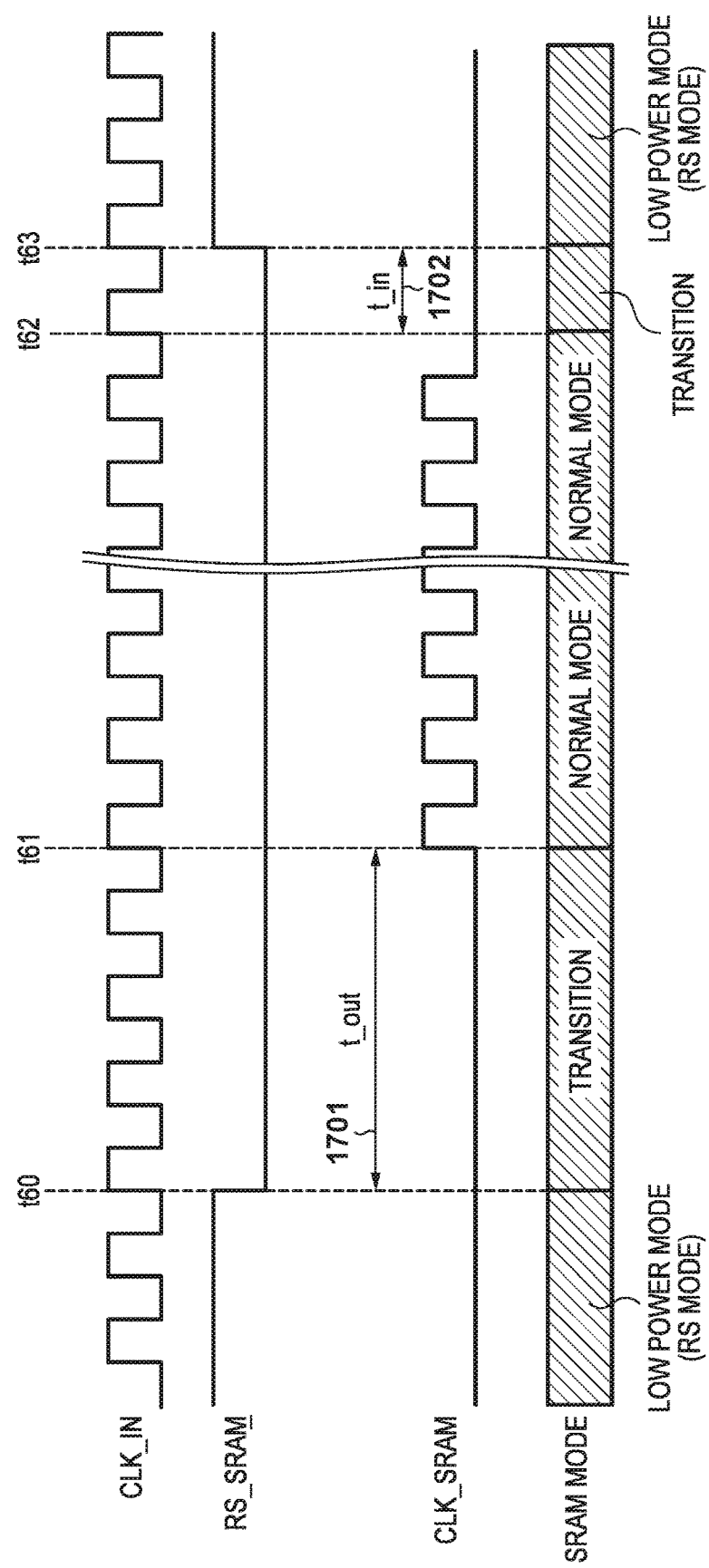

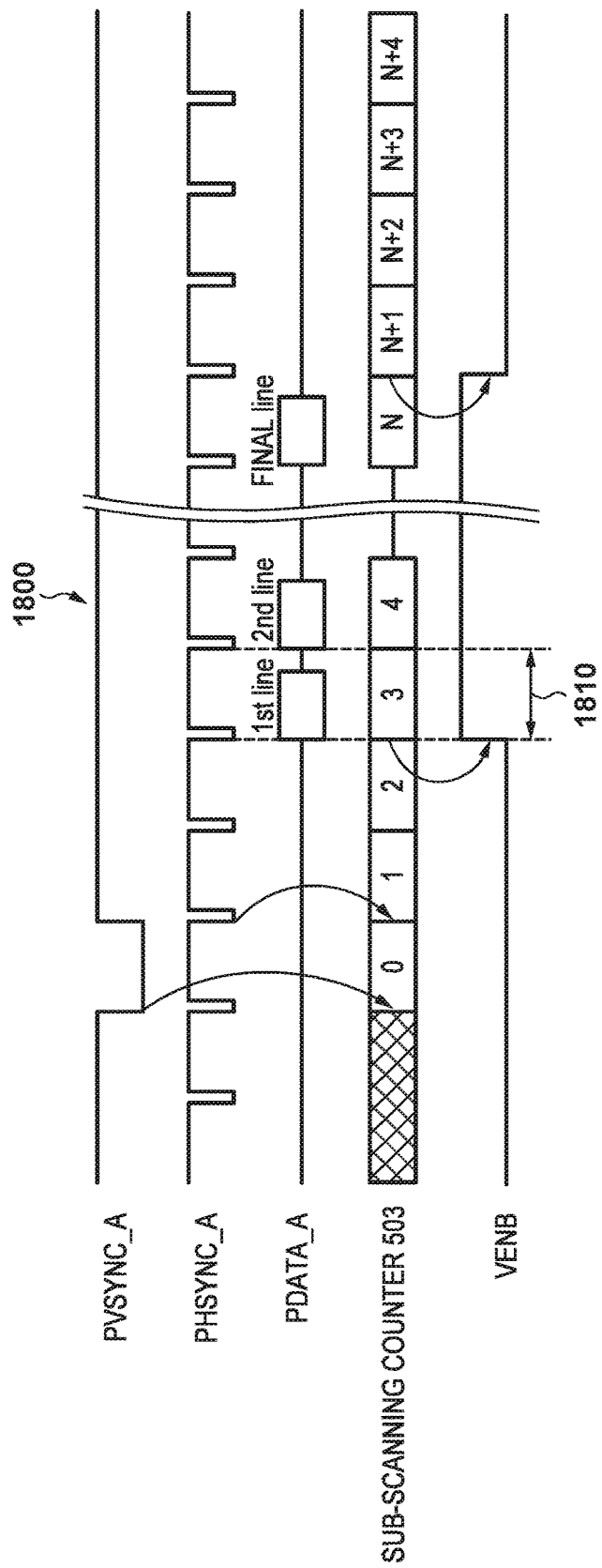

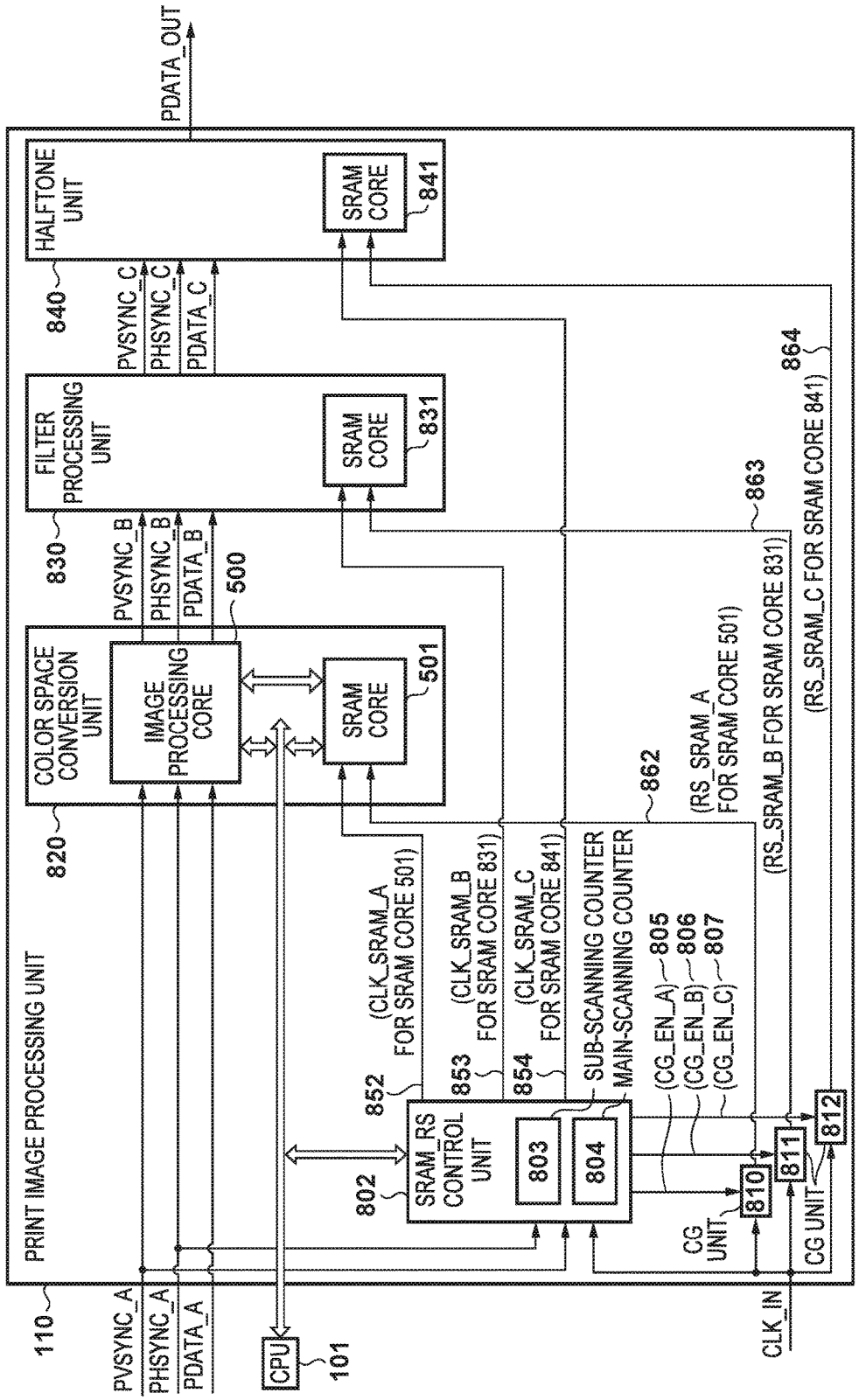

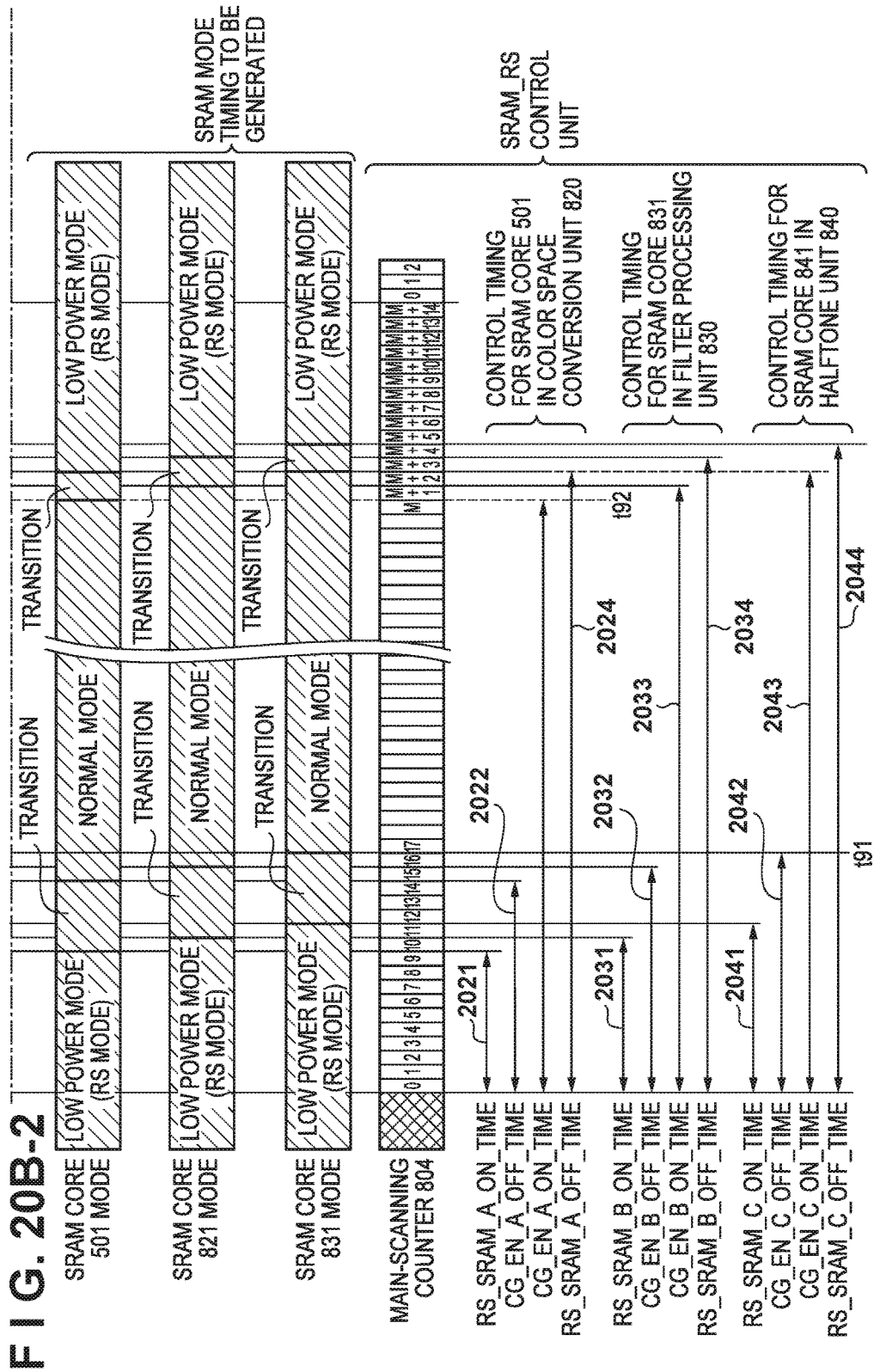

IMAGE READING APPARATUS AND PRINTING APPARATUS

BACKGROUND OF THE INVENTION

Field of the Invention

The present invention relates to an image reading apparatus that performs power saving control and is provided with a memory module having a low power consumption mode, and to a printing apparatus.

Description of the Related Art

In recent years, miniaturization of semiconductor integrated circuits is proceeding, and by this it has become possible to integrate SRAM and logic that had been divided among a plurality of chips into one chip. However, as this miniaturization proceeds, there is a trend that leakage current of a device increases. To reduce the leakage current, power cut-off in accordance with separation of power supply in a chip can be considered, but this cannot be used because held data disappears. Accordingly, to reduce a leakage current in a state where SRAM data is held, performing power saving by providing a minimum voltage for holding stored data with respect to a memory array portion and cutting a power supply for circuits not necessary for the holding of stored data such as peripheral circuits can be considered. In this way, a state for holding stored data in a memory module by a minimum current is referred to as a resume standby mode (an RS mode), and states other than the RS mode are referred to as normal modes.

In accordance with a desire for power saving and the previously described integration of a plurality of chips in recent years, the capacity of SRAM having an RS mode in a chip (hereinafter, referred to as resume SRAM) is increasing. In conjunction with this, in power consumption of an entire chip that is operating, a ratio occupied by SRAM power consumption tends to increase, and there is a demand that resume SRAM to be used cause the SRAM power consumption to be reduced as much as possible. Japanese Patent Laid-Open No. 2013-25843 proposes a technique for reducing a power consumption of the SRAM without causing resume SRAM to transition to a normal mode unnecessarily, by controlling activation of a resume standby signal from a CPU for controlling an RS mode of the resume SRAM.

Incidentally, respective image processing circuits for scanning, printing, or the like are provided on a chip incorporated in a digital multifunction peripheral. In such image processing, typically an SRAM is used as a buffer for holding an intermediate image or a table for various image processing coefficients. In addition, to execute a job such as a print or a scan by such a chip, firstly a job that should be executed by a chip in a controller that is connected to a UI or a network is recognized. It is typical to output an instruction for job processing execution or activation to a device such as a scanner or a printer from a CPU inside the chip.

However, there is a problem as is recited below in the foregoing conventional technique. For example, for an SRAM used inside a respective image processing circuit such as for a scan or a print, access (a write or a read) is executed after image data is input to the image processing circuit from a scanner or a printer. The access is stopped when the image processing circuit finishes outputting image data. That is, it is sufficient if an internal SRAM is activated in a normal mode only for a section where the image processing circuit is inputting or outputting image data, and controlling the SRAM in this fashion becomes the control for causing power consumption of the SRAM to reduce the most.

If an activation instruction is made from the CPU to a device such as a scanner after the CPU has controlled activation of the resume SRAM to a normal mode, activation is wastefully performed before image data is inputted to the resume SRAM, and an unnecessary normal mode state occurs. To attempt to ameliorate this, the CPU controlling activation to the normal mode of the resume SRAM immediately prior to input of image data can be considered. However, a timing immediately prior to input of the image data cannot be correctly grasped by the CPU, and it is difficult to perform a control instruction for activation to a normal mode at such a correct timing. Furthermore, the timing of a control instruction for activation to a normal mode changing due to interrupt processing from another factor occurring in the CPU can also be considered, and it is not possible to correctly output the control instruction at a desired timing (immediately prior to the input of image data).

SUMMARY OF THE INVENTION

The present invention enables realization of a mechanism for reducing power consumption by controlling a power saving mode of an SRAM based on a device synchronization signal, without being based on a job instruction.

One aspect of the present invention provides an image reading apparatus, comprising: a reading unit configured to read an image of an original; an image processing module to which image data read by the reading unit is inputted, and configured to perform image processing for the image data; a memory which is capable of transiting from a first power mode to a power-saving second power mode in accordance with an inputted control signal, and configured to store the image data that is image processed by the image processing module; and a control unit configured to control the control signal based on a synchronization signal that indicates a timing at which the reading unit outputs the image data to the image processing module.

Another aspect of the present invention provides a printing apparatus, comprising: an image processing module configured to perform image processing for inputted image data; a memory which is capable of transiting from a first power mode to a power-saving second power mode in accordance with an inputted control signal, and configured to store the image data that is image processed by the image processing module; and a print unit configured to perform printing based on the image data stored in the memory; and a control unit configured to control the control signal based on a synchronization signal that indicates a timing at which the image processing module outputs the image data to the print unit.

Further features of the present invention will be apparent from the following description of exemplary embodiments with reference to the attached drawings.

BRIEF DESCRIPTION OF THE DRAWINGS

FIG. 14 is a timing chart for explaining arbitration processing according to an embodiment.

FIGS. 15A and 15B are timing charts of a color space conversion unit according to an embodiment.

FIG. 17 is a timing chart for explaining a specification of an SRAM core according to an embodiment.

FIGS. 18A and 18B are timing charts for explaining operation of an SRAM_RS control unit according to an embodiment.

FIG. 19 is a block diagram of a print image processing unit according to an embodiment.

FIG. 20A, FIGS. 20B-1, and 20B-2 are timing charts for explaining operation of the SRAM_RS control unit according to an embodiment.

DESCRIPTION OF THE EMBODIMENTS

Figure 1:
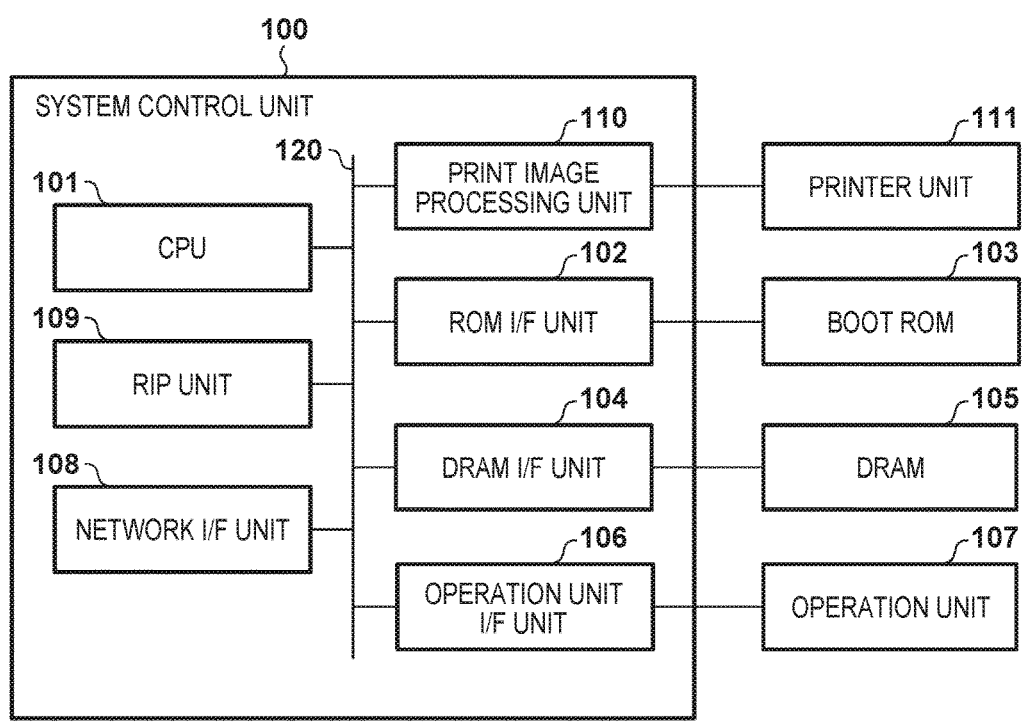
FIG. 1 is a block diagram of an overall system according to an embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Example of Configuration of Image Forming System>

Below, description will be given for a first embodiment of the present invention. In the present embodiment, explanation is given by taking a laser printer as an example of an image forming apparatus. Firstly, with reference to FIG. 1, explanation is given regarding an example of a configuration of an image forming system according to the present embodiment.

The image forming system is provided with a system control unit 100, a printer unit 111, a boot ROM 103, a DRAM 105, and an operation unit 107. The printer unit 111 which is an image output device is connected to the system control unit 100 via a print image processing unit 110. By controlling the printer unit 111, it is possible to realize print output that performs image formation on a recording material in accordance with image data. In the system control unit 100, a CPU 101, a ROM I/F unit 102, a DRAM I/F unit 104, an operation unit I/F unit 106, a network I/F unit 108, an RIP unit 109, and the printer unit 111 are connected by a bus 120.

The CPU 101 is a processor that controls the system overall, and it performs setting of the RIP unit 109, setting of the print image processing unit 110, and control of image data that is outputted to the printer unit 111. The CPU 101 comprehensively controls processing relating to print processing, in accordance with a control program or an OS loaded to the DRAM 105.

The ROM I/F unit 102 is an I/F module for accessing a boot ROM 103 that stores a boot program for the system. When the power supply of the system control unit 100 is input, the CPU 101 accesses the ROM I/F unit 102 to thereby access the boot ROM 103, and the CPU 101 performs a boot. The DRAM I/F unit 104 is an I/F module for accessing the DRAM 105 in which image data or a control program of the system is stored. The DRAM I/F unit 104 is provided with registers for performing control or setting of the DRAM 105, and these registers can be accessed from the CPU 101.

The operation unit I/F unit 106 performs acceptance of an operation instruction due to a user operating the operation unit 107, and control of a display of an operation result. The network I/F unit 108 is realized by a LAN card or the like for example, and performs input of device information or image data for print output with an external apparatus connected to a network such as a LAN (not shown).

The RIP unit 109 expands image data (PDL codes) received from an external apparatus via the network I/F unit 108 to bitmap data. The print image processing unit 110 is connected to the printer unit 111, and transfers image data for print output. The image data for print output indicates the bitmap data (RGB colors) extracted by the RIP unit 109. In addition, the print image processing unit 110 is set and controlled by the CPU 101, and performs various image processing for performing image formation of input image data to a recording medium (sheet) such as a print sheet by the printer unit 111.

<Printer Unit>

Figure 2:
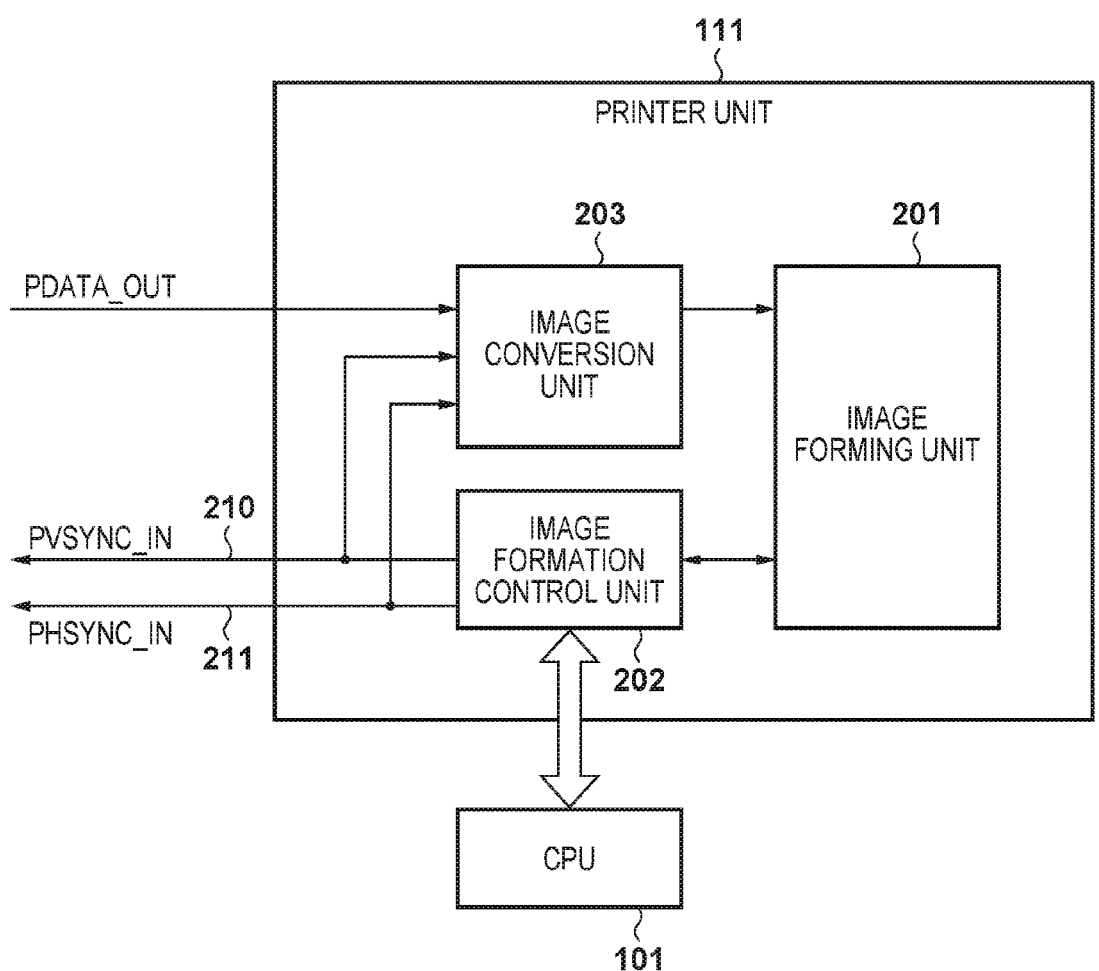
FIG. 2 is a block diagram of a printer unit according to an embodiment.

Next, with reference to FIG. 2, explanation is given regarding a detailed configuration of the printer unit 111. The printer unit 111 is provided with an image forming unit 201, an image formation control unit 202, and an image conversion unit 203. The image forming unit 201 is an electrophotographic printer, and executes a charging/exposure process on a photosensitive drum, a developing process for toner adhesion by a developer, a process to transfer the toner image to a recording medium by a transfer belt, and a process to fix the toner to the recording medium by a fixing device. In accordance with an instruction from the image formation control unit 202, the image forming unit 201 realizes image formation by executing the aforementioned electrophotographic processes while conveying the recording medium by a conveyance unit (not shown).

The image formation control unit 202 executes a request for image data to the system control unit 100 in accordance with control by the image forming unit 201 and a control timing thereof. The image formation control unit 202 communicates with the CPU 101, and accepts a printer activation instruction from the CPU 101. The image formation control unit 202 causes the image forming unit 201 to operate in accordance with the instruction, issues a request for image data at a desired timing, and performs the image formation.

A request for image data is the transmission of a PHSYNC_IN signal 211 and a PVSYNC_IN signal 210, which are illustrated in FIG. 2, to the print image processing unit 110. These signals are printing synchronization signals for obtaining synchronization of an exchange of image data between the system control unit 100 and a device (the printer unit 111), and are input to the print image processing unit 110. The PVSYNC_IN signal 210 is a synchronization signal issued at the start of each page of the image data to undergo image formation, and is referred to as a vertical synchronizing signal. The PHSYNC_IN signal 211 is a synchronization signal issued at the start of each line of the image data to undergo image formation, and is referred to as a horizontal synchronizing signal. By receiving these signals, the system control unit 100 can transmit the image data in alignment with the timing requested by the printer unit 111.

Specifically, the PVSYNC_IN signal 210 is issued when the image forming unit 201 conveys a recording medium and the recording medium has reached a predetermined position (before a transfer position). By this, a timing at which the PVSYNC_IN signal 210 is issued is controlled so that a toner image to transfer is prepared when the recording medium has reached the transfer position. Note that, for detection of the predetermined position, it is assumed that a mechanical or optical detection sensor is used.

In addition, a laser for forming an electrostatic latent image on the photosensitive drum of the image forming unit 201 is irradiated on each line, and the PHSYNC_IN signal 211 is issued at the start of such an irradiation line. By this it is possible to obtain synchronization of a timing for forming the electrostatic latent image on the photosensitive drum and the timing for preparation of the image data therefor. Note that, for detection of an irradiation position of the laser, a detection sensor (a Beam Detect sensor) is used.

Next, the image conversion unit 203 receives image data PDATA_OUT from the system control unit 100 in alignment with the timing requested by the image formation control unit 202. The image conversion unit 203 performs a PWM conversion (pulse width modulation) on the received image data PDATA_OUT, and uses the laser driver to perform laser irradiation on the photosensitive drum of the image forming unit 201.

<Print Image Processing Unit>

Figure 3:
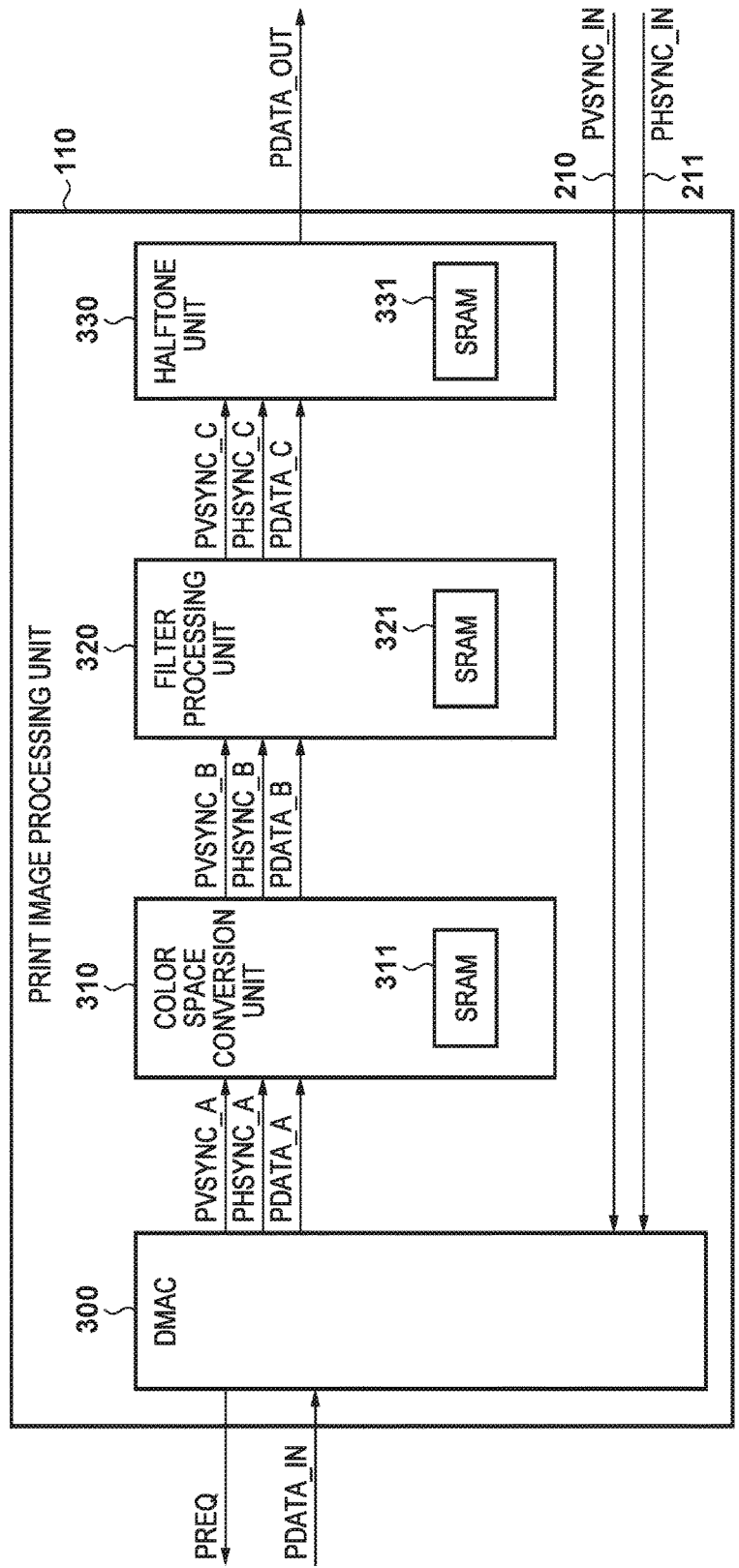
FIG. 3 is a block diagram of a print image processing unit according to an embodiment.

Next, with reference to FIG. 3, explanation is given regarding the print image processing unit 110 according to the present embodiment. The print image processing unit 110 is provided with a DMAC 300, a color space conversion unit 310, a filter processing unit 320, and a halftone unit 330.

Firstly, the DMAC 300 is a direct memory access controller that, in accordance with a request from the printer unit 111, issues a request signal PREQ to the DRAM I/F unit 104, and receives from the DRAM 105 image data PDATA_IN that is for print output. The DMAC 300 outputs the received PVSYNC_IN signal 210 and PHSYNC_IN signal 211 as a PVSYNC_A signal and a PHSYNC_A signal to the color space conversion unit 310 which is a latter-stage module. Furthermore, the DMAC 300 outputs the received image data PDATA_IN signal as a PDATA_A signal to the color space conversion unit 310. The phase relationship (timing) of the PVSYNC_A signal, the PHSYNC_A signal, and the PDATA_A signal is always fixed, and by this it is possible to obtain synchronization between the system control unit 100 and the printer unit 111.

Next, the color space conversion unit 310 converts the RGB data input as PDATA_A to CMYK data, and outputs it to the filter processing unit 320 as PDATA_B. In addition, a lookup table that defines coefficients for color space conversion is stored in an SRAM 311, and it is referred to at a time of color space conversion processing. At this time, a processing delay time occurs from when the PDATA_A signal is input until the PDATA_B signal is output. The PVSYNC_B signal and the PHSYNC_B signal are designed to be output after having the same processing delay time from the input of the PVSYNC_A signal and the PHSYNC_A signal. By this, the phase relationship of the three output signals is the same as that of the three input signals.

Next, the filter processing unit 320 executes filtering processing having an objective such as edge emphasis with respect to the CMYK data input as PDATA_B, and a processing result is output to the halftone unit 330 as PDATA_C. At this time, it is necessary to refer to a plurality of lines of an image to perform filter processing, and therefore an SRAM 321 is used as a line buffer. The PVSYNC_C signal, the PHSYNC_C signal, and the PDATA_C signal are output to the latter-stage halftone unit 330 with the same delay time, similarly to for the color space conversion unit 310 described previously.

Next, the halftone unit 330 performs halftone processing in accordance with a dither matrix method that is a known technique with respect to an input multi-value image signal to perform processing to convert it to an image signal for which a density expression by the printer unit 111 is possible. In addition, dither threshold matrix coefficients for the halftone processing are stored in an SRAM 331, and these are referred to at a time of the halftone processing. The image data to which halftone processing has been performed is output as a PDATA_OUT signal to the printer unit 111 which is a latter stage. Note, via the CPU 101 the printer unit 111 knows in advance the interval taken from when printing synchronization signals (the PVSYNC_IN signal 210, the PHSYNC_IN signal 211) are issued until the PDATA_OUT signal is received. Accordingly, it starts reception of PDATA_OUT from a predetermined timing.

<Processing Timing of Print Image Processing Unit>

Figure 4:
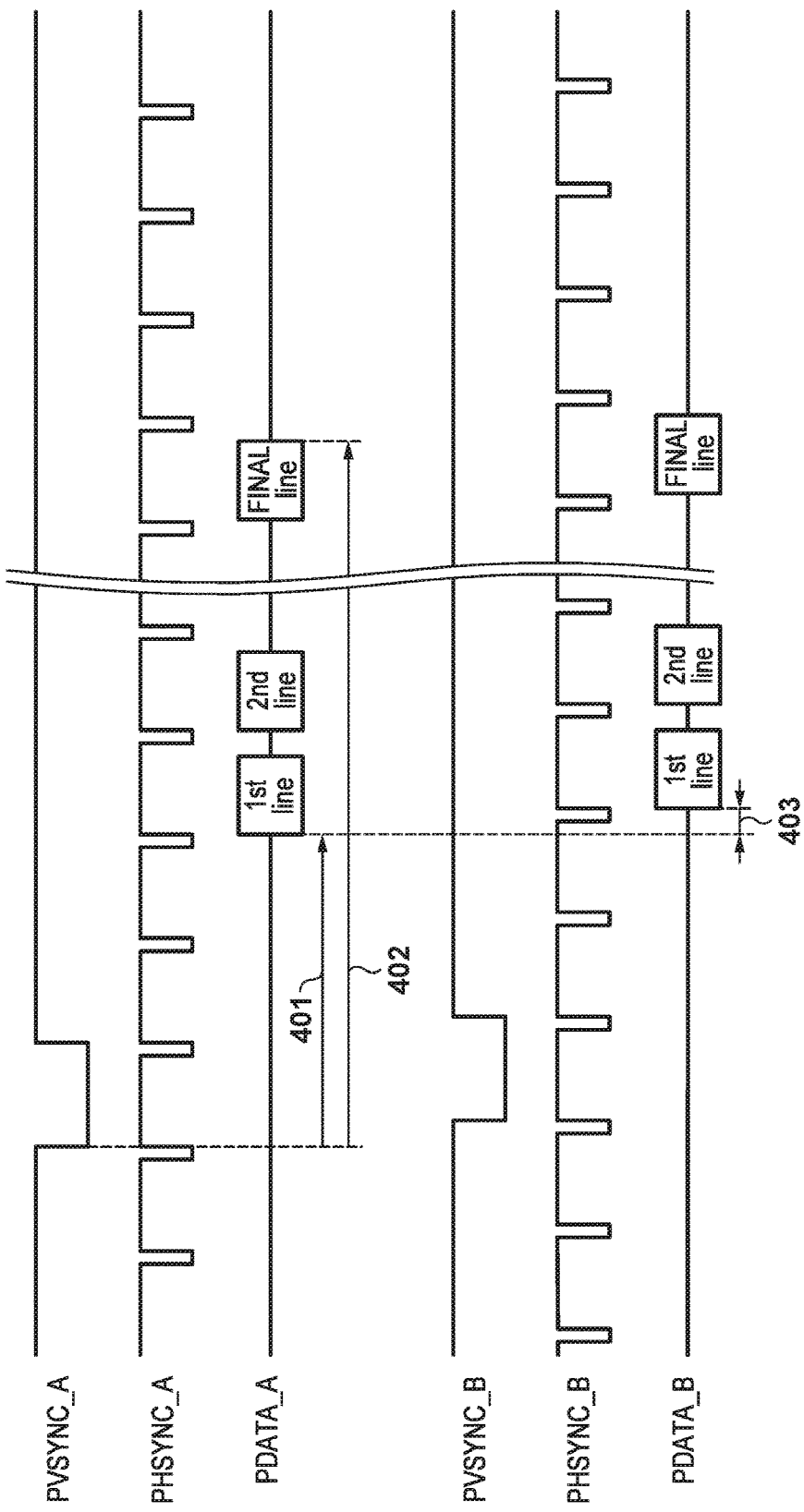
FIG. 4 is a timing chart of a color space conversion unit according to an embodiment.

Next, with reference to FIG. 4, explanation is given regarding processing timing of a print image processing unit. Here, explanation is given regarding an input/output timing chart of the color space conversion unit 310, as an example.

The PVSYNC_A signal is the PVSYNC_IN signal 210 which is a vertical synchronizing signal issued by the printer unit 111 at a predetermined timing, and is input to the color space conversion unit 310 via the DMAC 300. This signal is issued at the start of an image (page), and is a Low active signal. When this signal becomes Low, the image data is input after a predetermined timing.

The PHSYNC_A signal is the PHSYNC_IN signal 211 which is a horizontal synchronizing signal issued by the printer unit 111 at a predetermined timing, and is input to the color space conversion unit 310 via the DMAC 300. This signal is issued at the start of each line of image data, and is a Low active signal. When this signal becomes Low, one line of image data is input after a predetermined timing.

Here, a number of lines (a number of Low pulses of the PHSYNC_A signal) after the PVSYNC_A signal becomes Low until the first line of data is input is shown in the figure as a leading edge width 401. The leading edge width 401 is decided in accordance with a position of the detection sensor explained by FIG. 2. In addition, a number of lines from when the PVSYNC_A signal becomes Low until input of the first page of the image completes is shown in the figure as a trailing edge width 402. Note that the trailing edge width 402 is the leading edge width 401+an effective line width. The leading edge width and the trailing edge width indicate the leading edge and a trailing edge for a period in which an SRAM mode described later stays in a normal mode.

In addition, the PVSYNC_B, PHSYNC_B, and PDATA_B signals, are respectively the PVSYNC_A, PHSYNC_A, and the PDATA_A signals which are output with a predetermined amount of delay. At this time, image processing (color space conversion in this module) is applied to PDATA_B, and the aforementioned predetermined amount of delay is the delay time incurred for this image processing. Here, the processing delay time is shown in the figure as a delay time 403. This timing chart relates to the color space conversion unit 310, but it is possible to draw a similar input/output timing chart for the filter processing unit 320 and the halftone unit 330. Although a delay time differs in accordance with details of image processing, the timing relationship of each signal is similar to that in FIG. 4.

<Details of Image Processing Unit>

Figure 5:
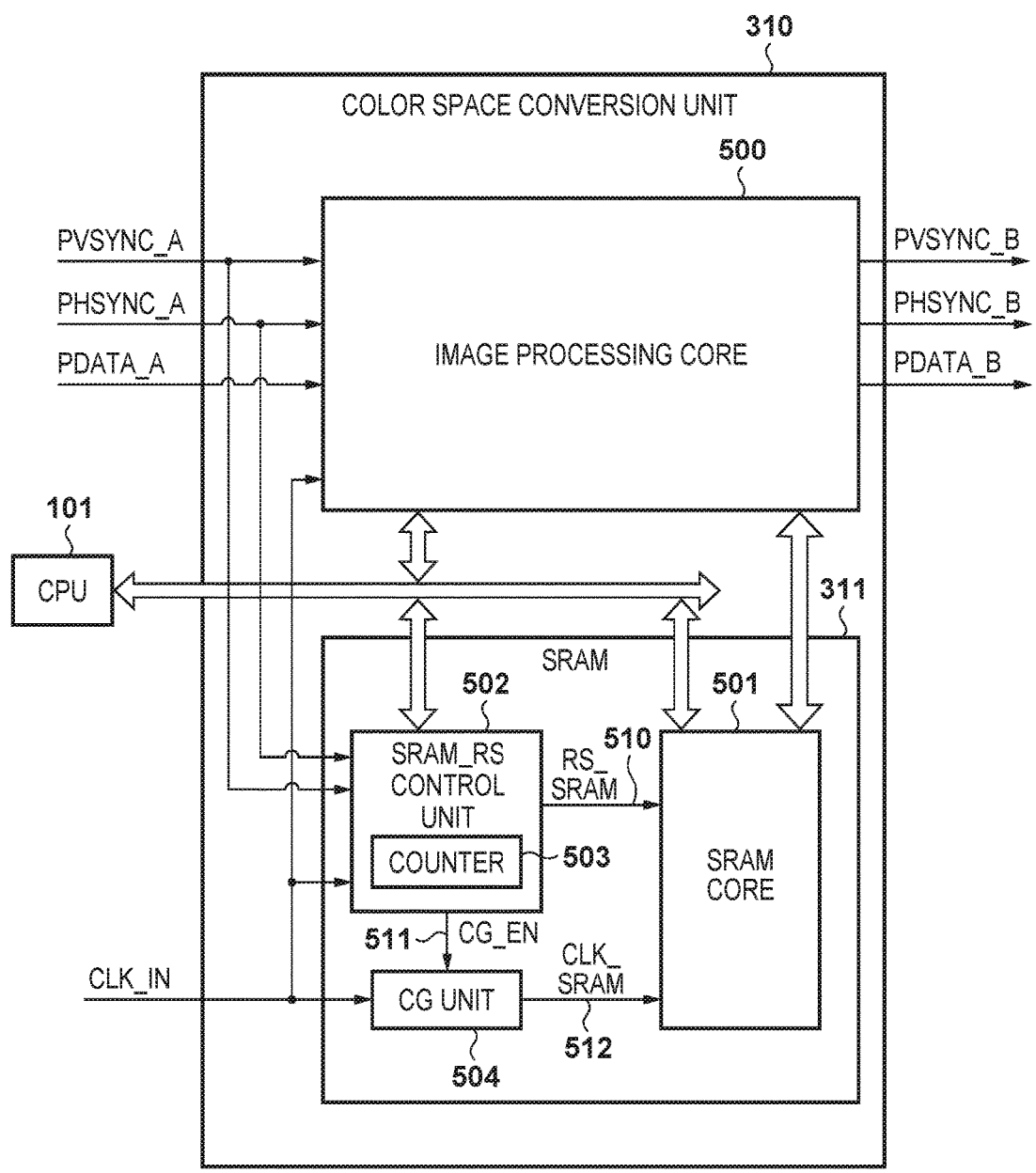
FIG. 5 is a block diagram of a color space conversion unit according to an embodiment.

Next, with reference to FIG. 5, explanation is given regarding an example of a configuration of each image processing unit in the print image processing unit 110. As an example here, explanation is given regarding an example of a configuration of the color space conversion unit 310. Because other image processing modules have a similar configuration, a detailed explanation is omitted.

The color space conversion unit 310 is provided with an image processing core 500 and the SRAM 311. The SRAM 311 is provided with an SRAM_RS control unit 502 and a CG unit 504. CLK_IN, which is an operating clock of the color space conversion unit 310, is input to the image processing core 500 and the SRAM 311. The image processing core 500 is provided with a plurality of registers necessary for settings of the image processing (color space conversion), and is set from the CPU 101. In addition, the image processing core 500 is connected to an SRAM core 501, and coefficients required for color space conversion are obtained from the SRAM core 501. The SRAM 311 is provided with the SRAM_RS control unit 502, the CG unit 504, and the SRAM core 501.

The SRAM core 501 is an SRAM core that has a resume standby mode (RS mode) which is a state in which stored data in the SRAM is held by a minimum current. The RS mode is a power saving mode (a second power mode) for holding data in accordance with power saving, by providing a minimum voltage at which it is possible to hold stored data with respect to a memory array portion inside the SRAM and cutting power supply of circuits not necessary for storage of stored data, such as peripheral circuits. In addition, a state other than the RS mode is referred to as a normal mode (a first power mode), a section for changing these two modes is referred to as a section for transitioning, and details thereof are described later. Whether to set the SRAM core 501 to the RS mode is controlled by an RS_SRAM signal 510 that is output by the SRAM_RS control unit 502. The RS mode is entered in a section in which the RS_SRAM signal 510 is HIGH, and control is performed such that supply of a clock from the CLK_SRAM signal 512 is stopped during the RS mode.

The SRAM_RS control unit 502 controls the clock signal and the RS SIGNAL of the SRAM core 501. For the control method, firstly a number of Low pulses of the PHSYNC_A signal from when the Low pulse of the PVSYNC_A signal is input is counted by a counter 503. In accordance with counting a predetermined number, control of the RS_SRAM signal 510 and a CG_EN signal 511 is performed. The predetermined number counted which is a threshold value at this point is set to the SRAM_RS control unit 502 by the CPU 101. Furthermore, the SRAM_RS control unit 502 controls output phases of the RS_SRAM signal 510 and the CG_EN signal 511 in alignment with an SRAM request specification, and performs controls such as causing the clock to stop at a time of transition to the RS mode.

Because a vertical synchronizing signal is a signal for notifying before a start of image processing of one page, by controlling the RS_SRAM signal 510 based on the SVSYNC_A signal in this way, it is possible to set the SRAM core 501 to the normal mode immediately prior to the start of image processing without going through the CPU 101. In addition, there are cases in which it is necessary to write a conversion coefficient to SRAM in advance before image processing as in color space conversion. In such a case, a configuration that can forcibly set the SRAM core to the normal mode (set the RS_SRAM signal 510 to Low) via the CPU 101, and write desired data from the CPU 101 to the SRAM core 501 is taken. The RS mode is returned to after the completion of the writing in accordance with the CPU 101.

The CG unit 504 controls whether to transfer the CLK_IN signal to the CLK_SRAM signal 512 unchanged or whether to cause the CLK_IN signal to stop, in accordance with the logic of the CG_EN signal 511. Note that, in this module, a color space conversion coefficient is stored in the memory array portion of the SRAM core 501. Other image processing modules basically also store coefficients for achieving image processing or image data as a line buffer for referring to a plurality of lines, and have a similar configuration to the present block diagram.

<SRAM Mode Transition Timing>

Figure 6:
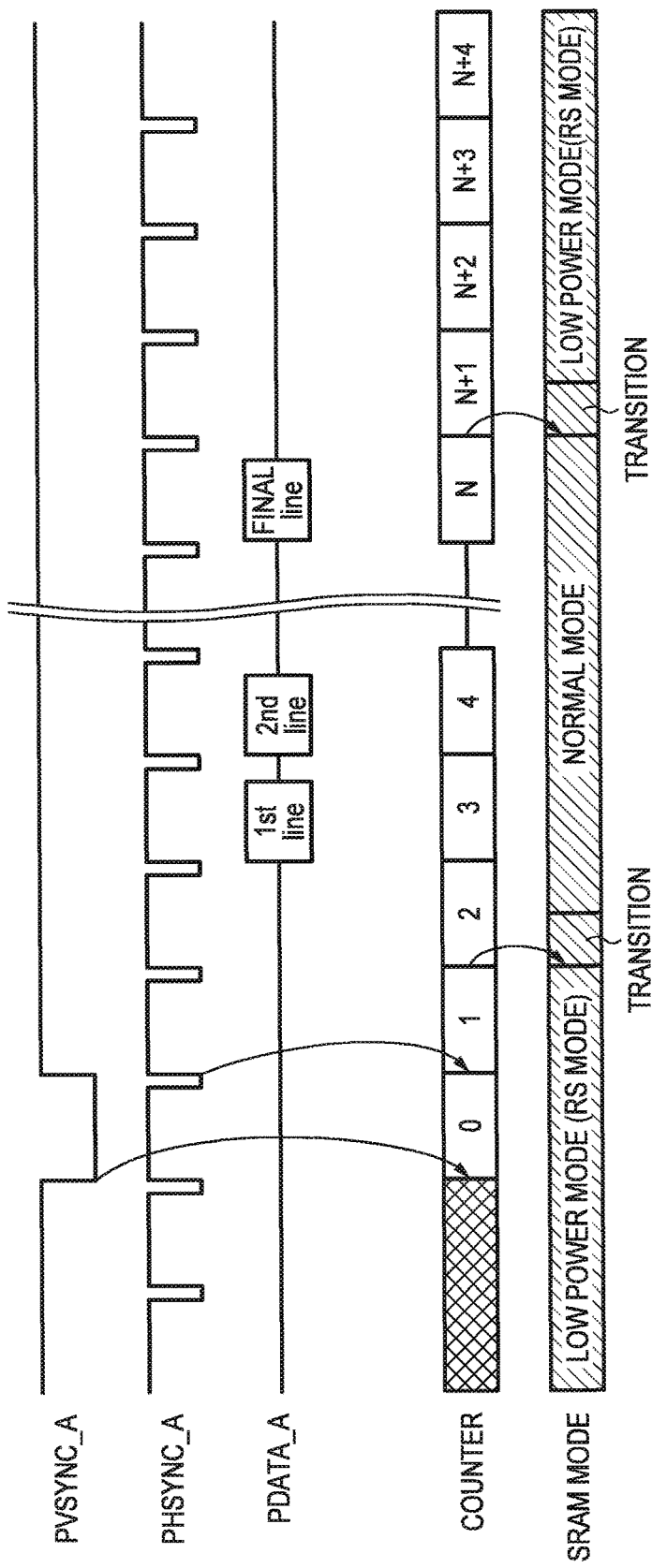
FIG. 6 is a timing chart for explaining transitions of SRAM modes according to an embodiment.

Next, with reference to FIG. 6, explanation is given regarding a transition timing of the SRAM mode in the print image processing unit 110. The SRAM mode is something that indicates whether the SRAM core 501 is in the RS mode or the normal mode, or during a mode transition. Here, explanation is given regarding a timing chart of the color space conversion unit 310, as an example.

When the Low pulse of the PVSYNC_A signal is input to the color space conversion unit 310, the internal counter 503 is cleared to zero. Thereafter, each time the Low pulse of the PHSYNC_A signal is input (each line), "+1" is added to the counter 503.

Next, giving attention to the PDATA_A signal, in the present example data for the first line is input when the value of the counter 503 indicates 3. In other words, the leading edge width 401 of FIG. 4 is three lines. In addition, data for the final line has been input when the value of the counter 503 indicates N. In other words, the trailing edge width 402 of FIG. 4 is N+1. Accordingly, the SRAM mode being the normal mode in the section where the value of the counter 503 is 3 to N is the minimum width of the normal mode, and it is understood that this is the best usage for suppressing power consumption.

Therefore, the CPU 101 controls the SRAM_RS control unit 502 so as to first cause a transition from the RS mode to the normal mode in accordance with the value of the counter 503 indicating 2, and further cause a transition from the normal mode to the RS mode in accordance with the value of the counter 503 indicating N+1. Specifically, the CPU 101 sets in the SRAM_RS control unit 502 a counter predetermined number for transitioning to the normal mode to 2, and a counter predetermined number for transitioning to the RS mode to N+1. By setting in advance in this way, it is possible to have SRAM power consumption at a time of print output operation be a required minimum.

<SRAM Mode Transition Details>

Figure 7:
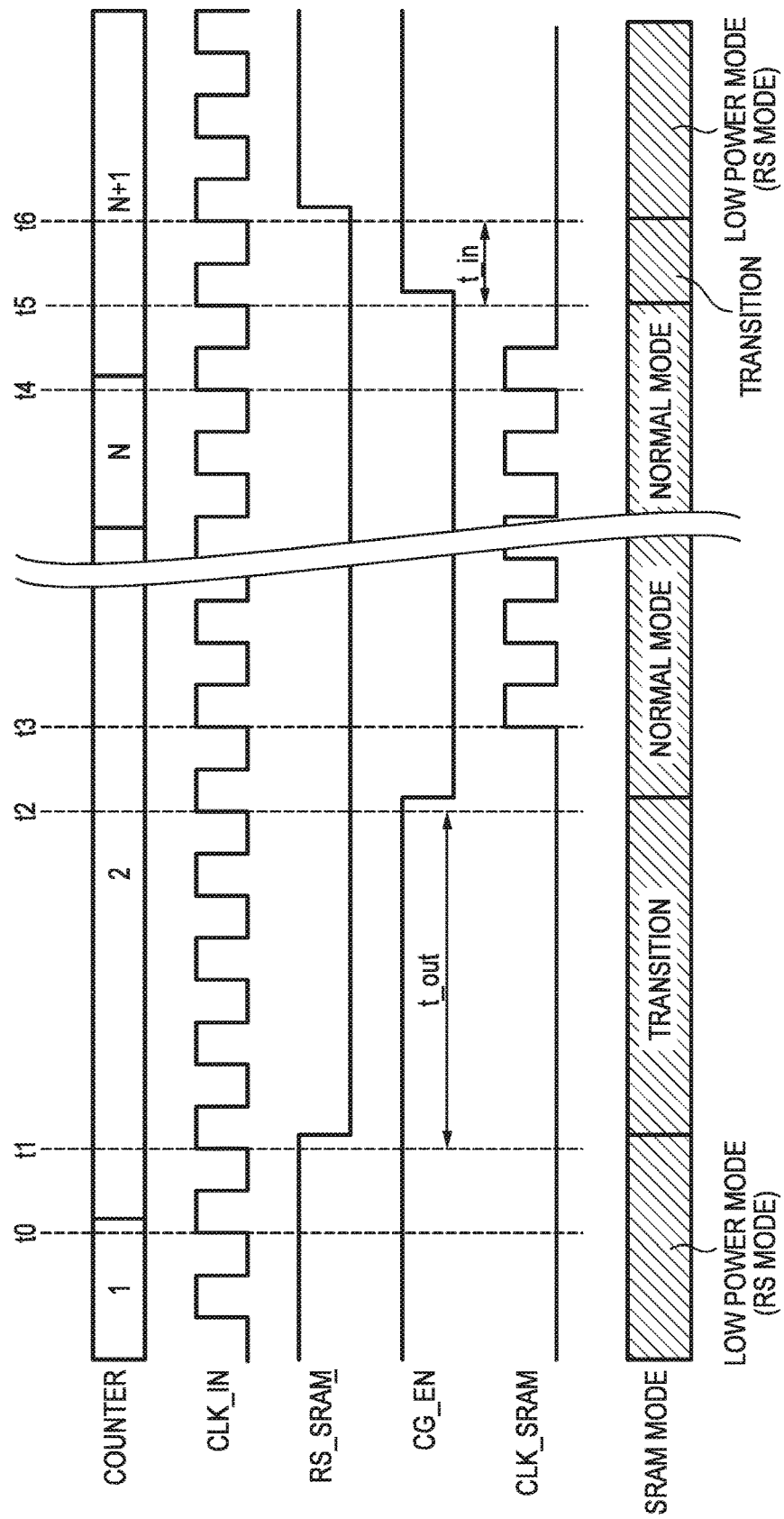
FIG. 7 is a timing chart for explaining operation of an SRAM core according to an embodiment.

Next, with reference to FIG. 7, explanation is given regarding detailed timing regarding transitions of the SRAM mode. Firstly, a return sequence from the RS mode to the normal mode is explained.

At a time to, a situation in which the Low pulse of the PHSYNC_A signal has been received and the counter value of the counter 503 has become 2 is illustrated. The SRAM_RS control unit 502 accepts that the counter value has become 2, and controls the RS_SRAM signal 510 to Low at a time t1. The SRAM_RS control unit 502 sets the RS_SRAM signal 510 to Low, and sets the CG_EN signal 511 to Low at a time t2 that is a time after a t_out interval has elapsed. For the t_out interval, the interval is decided in accordance with a storage capacity of the SRAM core 501, and the interval lengthens as the storage capacity increases. The CG unit 504 accepts Low of the CG_EN signal 511, and transmits the CLK_SRAM signal 512 at a time t3. By the above processing, the SRAM core 501 completes the transition to the normal mode.

Next, explanation is given regarding an RS mode transition sequence of the SRAM. At a time t4, a situation in which the Low pulse of the PHSYNC_A signal has been received and the counter value of the counter 503 has become N+1 is illustrated. The SRAM_RS control unit 502 accepts that the counter value has become N+1, and controls the CG_EN signal 511 to High at a time t5. When the CG_EN signal 511 becomes High, the CG unit 504 causes the CLK_SRAM signal 512 to stop. The SRAM_RS control unit 502 sets the CG_EN signal 511 to High, and sets the RS_SRAM signal 510 to High at a time t6 that is after a t_in interval. For the t_in interval, the interval is decided in accordance with a storage capacity of the SRAM core 501, and the interval lengthens as the storage capacity increases. By the above processing, the SRAM core 501 completes the transition to the RS mode.

Note that a section (t_out) from when the RS_SRAM signal 510 is set to Low until the CG_EN signal 511 becomes Low is a section for transitioning to the normal mode. Note that a section (t_in) from when the RS_SRAM signal 510 is set to High until the CG_EN signal 511 becomes High is a section for transitioning to the RS mode.

As is seen from FIG. 7, a section required for transitioning is some several cycles to several tens of cycles. In addition, the width of the horizontal synchronizing signal in the printer (the width from a Low pulse of the PHSYNC_IN signal 211 until the next Low pulse) is typically several thousands of cycles to several tens of thousands of cycles. Furthermore, an interval from an SVSYNC_IN signal 710 until input of a first line of image data depends on an attachment position of the position detection sensor explained by FIG. 2, but an interval for several lines to several hundreds of lines is left blank. In other words, a section in which a transition is possible is sufficiently present in the section from when the PVSYNC_IN signal 210 is input until the first line of the image data is input. Accordingly, if the SRAM 311 is immediately set to the normal mode at an input time of the PVSYNC_IN signal 210, power will be wastefully consumed.

<Overall Processing Timing of Print Image Processing Unit>

Figure 8:
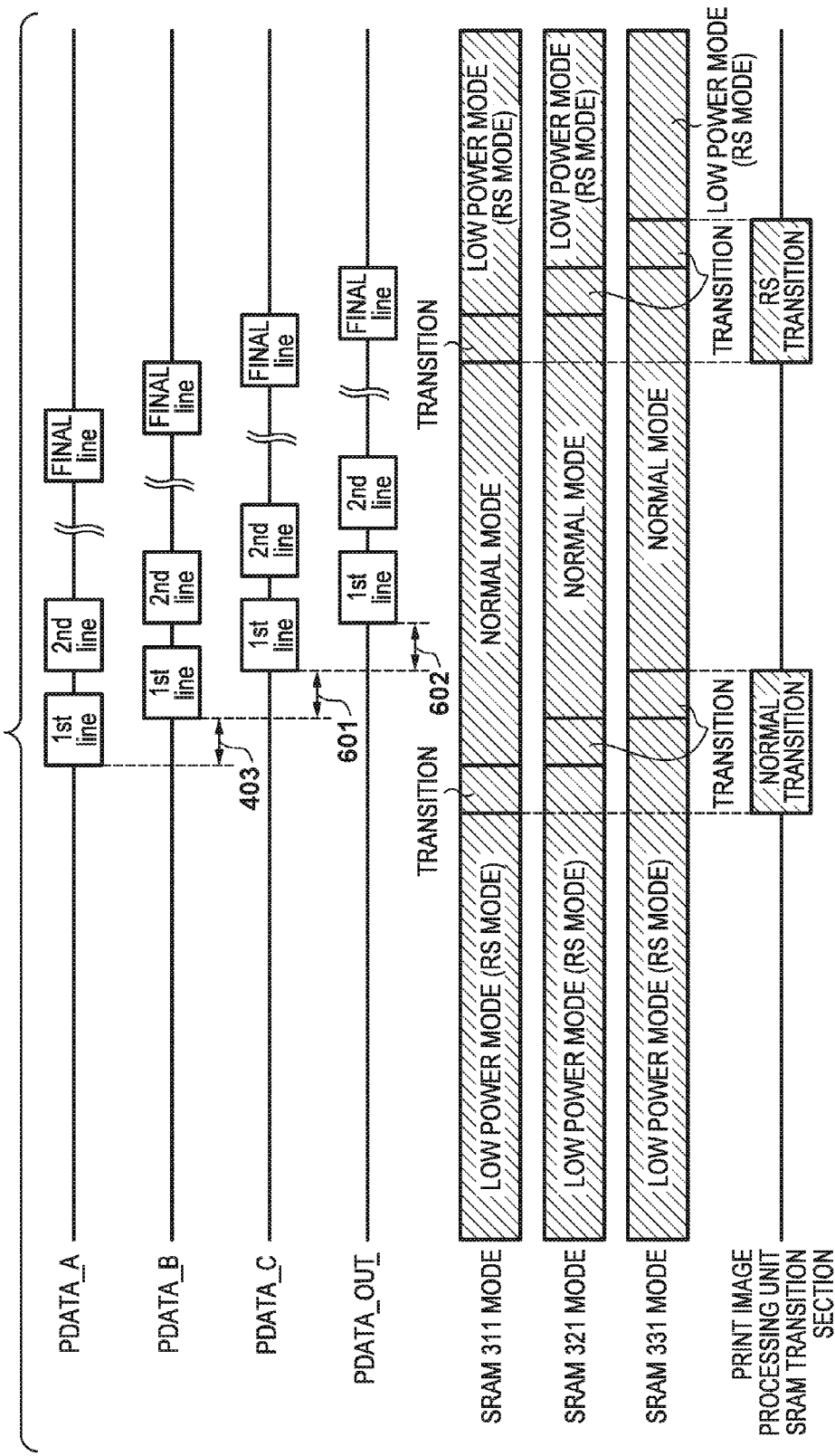
FIG. 8 is a timing chart for explaining a print image processing unit according to an embodiment.

Next, with reference to FIG. 8, explanation is given regarding timing in relation to data input/output of the color space conversion unit 310, the filter processing unit 320, and the halftone unit 330 of the print image processing unit 110, and an SRAM mode transition.

The delay time 403 indicates a delay time due to processing by the color space conversion unit 310 illustrated in FIG. 4. Furthermore, a delay time 601 indicates a delay time due to processing by the filter processing unit 320, and indicates an interval from when PDATA_B is input to the filter processing unit 320 until PDATA_C is output. Similarly, a delay time 602 indicates a delay time due to processing by the halftone unit 330.

An SRAM 311 mode indicates in relation to transitions of the SRAM mode of the SRAM 311 which is provided inside the color space conversion unit 310. It transitions to the normal mode before input of the first line of PDATA_A to the color space conversion unit 310, and transitions to the RS mode after output of the final line in accordance with PDATA_B from the color space conversion unit 310.

Similarly, an SRAM 321 mode illustrates in relation to transitions of the SRAM mode of the SRAM 321 which is provided inside the filter processing unit 320. It transitions to the normal mode before input of the first line of PDATA_B to the filter processing unit 320, and transitions to the RS mode after output of the final line in accordance with PDATA_C from the filter processing unit 320.

Similarly, an SRAM 331 mode indicates in relation to transitions of the SRAM mode of the SRAM 331 which is provided inside the halftone unit 330. It transitions to the normal mode before input of the first line of PDATA_C to the halftone unit 330, and transitions to the RS mode after output of the final line in accordance with PDATA_OUT from the halftone unit 330.

Here, focus is given to the transition timing of each of the SRAMs 311, 321, and 331. As illustrated in FIG. 8, processing for returning to the normal mode from the power saving mode (transition processing) is performed in a processing order of each image processing module. SRAM provided in a latter-stage image processing module starts transition processing at a timing after an interval corresponding to a processing delay time in a preceding stage image processing module has elapsed after the SRAM provided in the preceding stage image processing module has started transition processing. For example, if a setting of a predetermined number for a counter that is a trigger for an SRAM mode transition of each module is shared by all, as illustrated in FIG. 8, the transition timing of each SRAM is delayed in alignment with the delay time of each module. Accordingly, the transition timing of each SRAM is shifted, and execution at the same time does not occur.

Incidentally, there is a problem in that if the capacity of an SRAM that has an RS mode in the chip increases, accordingly a peak current of a rush current (inrush current) at a time of returning from the RS mode to a normal mode increases, and guaranteed holding in a low-voltage operation becomes difficult. Accordingly, shifting the transition timing in accordance with the delay time in this way is an effective method to avoid this problem due to the rush current.

For example, if the delay time in accordance with image processing of each module is less than the transition interval, a delay buffer is inserted into the circuit so that the delay time becomes greater than or equal to the transition interval. In addition, configuration may be taken so as to shift, with respect to other modules, the setting of the counter predetermined number only for modules for which the delay time is less than the transition interval.

In FIG. 8, a section from the first SRAM transition to a final stage SRAM transition is defined as an SRAM transition section of the print image processing unit 110, and it is possible to view the total of sections for transitioning as a section for transitioning of the print image processing unit 110. Here a section for transitioning to the normal mode is shown in the figure as a "normal transition", and a section for transitioning to the RS mode is shown in the figure as an "RS transition".

As explained above, in the present embodiment, based on synchronization signals of a device such as a printer unit, transition control to a normal mode or the RS mode of the resume SRAM is performed. By controlling in this way, it is possible to cause power consumption of resume SRAM inside an image processing circuit that operates in synchronization with the synchronization signals to reduce. In addition, by performing control of the resume SRAM for transitioning to the normal mode or the RS mode without going through the CPU, it is possible to perform transition control at an accurate timing for minimizing power consumption.

As a comparative example, if the resume SRAM is caused to be controlled without going through the CPU, the resume SRAM is set to the normal mode before activation of the printer unit 111. This means that the normal mode is entered before conveyance of a recording medium by the printer unit 111 starts, and the normal mode is wastefully entered for a long interval (several seconds). Typically the RS mode has power consumption of approximately 40% of the normal mode, and furthermore, in conjunction with improvements in image quality of image forming apparatuses in recent years, the capacity of SRAM that is mounted for image processing internally is increasing. Accordingly, accordingly, transition control of resume SRAM as in the present embodiment can cause a proportion of SRAM power consumption in a system to be greatly reduced.

Note that explanation was given in the present embodiment by taking a printer as a device side example, but with regards to a scanner it is also possible to similarly cause power consumption of resume SRAM to reduce by performing transition control of the resume SRAM based on synchronization signals between the scanner and the system.

Second Embodiment

Below, description will be given for a second embodiment of the present invention. In the first embodiment described above, explanation was given regarding a method for reducing SRAM power consumption by performing control to transition to a normal mode or an RS mode of a resume SRAM based on printing synchronization signals of a printer unit, in accordance with a configuration of a halftone unit printer having only a print function. In such a case, because each internal module of the print image processing unit 110 that has an SRAM is connected with a delay time to the pipeline, the transition timings of the SRAM are shifted, and it is possible to avoid the problem due to a rush current. However, in the case of having a scanning function and not only a print function as with a multifunction peripheral and additionally a scan image processing unit that has resume SRAM similarly to a print image processing unit, there is the possibility that a transition timing for a print side and a transition timing for a scanner side overlap. In the case that they overlap, there is the possibility for a problem due to a rush current to arise. Accordingly, explanation is given in the present embodiment regarding an embodiment that can avoid a problem due to a rush current in a multifunction peripheral that has both of a scan function and a print function.

Note that, regarding portions common with the first embodiment described above (the printer unit 111, the print image processing unit 110, and common portions of the system control unit 100), details are omitted or simplified, and explanation is given below mainly on portions that are points of difference.

<Configuration of Image Forming System>

Figure 9:
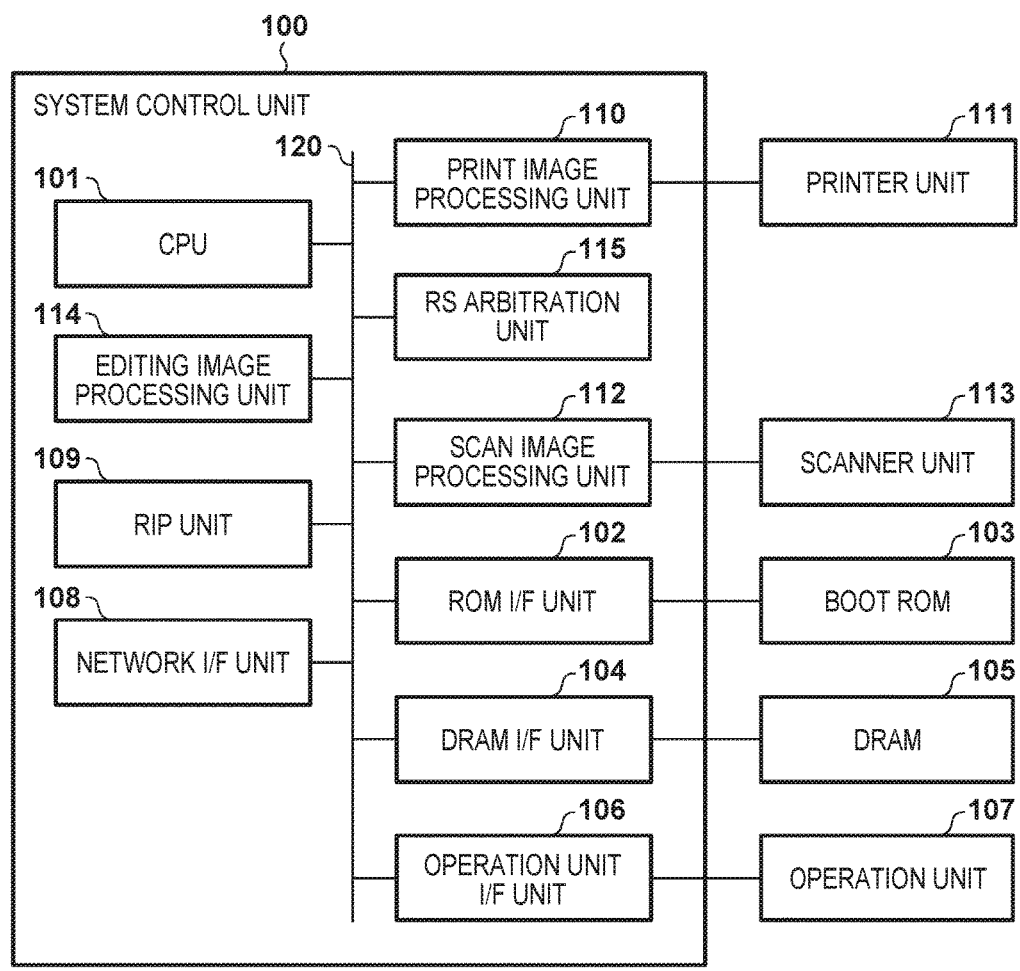
FIG. 9 is a block diagram of an overall system according to an embodiment.

Firstly, with reference to FIG. 9, explanation is given regarding an example of a configuration of an image forming system for explaining the present embodiment. The image forming system is further provided with a scanner unit 113 in addition to the configuration of FIG. 1 explained in the foregoing first embodiment. Furthermore, the system control unit 100 is provided with a scan image processing unit 112, an editing image processing unit 114, and an RS arbitration unit 115 in addition to the configuration of FIG. 1. From the CPU 101 to the printer unit 111 is similar to in the first embodiment. The scanner unit 113 which is an image input device is connected to the system control unit 100 via the scan image processing unit 112. By controlling the scanner unit 113, scan input of the image data is realized.

The editing image processing unit 114 is set and controlled by the CPU 101, and performs various kinds of image processing such as rotation, magnification, trimming/masking, binarization, and multi-value conversion of image data. The RS arbitration unit 115 is an arbitration module that regulates such that a timing of a transition of an SRAM mode of a resume SRAM of the print image processing unit 110 does not overlap with a timing of a transition of an SRAM mode of a resume SRAM of the scan image processing unit 112.

<Scanner Unit>

Figure 10:
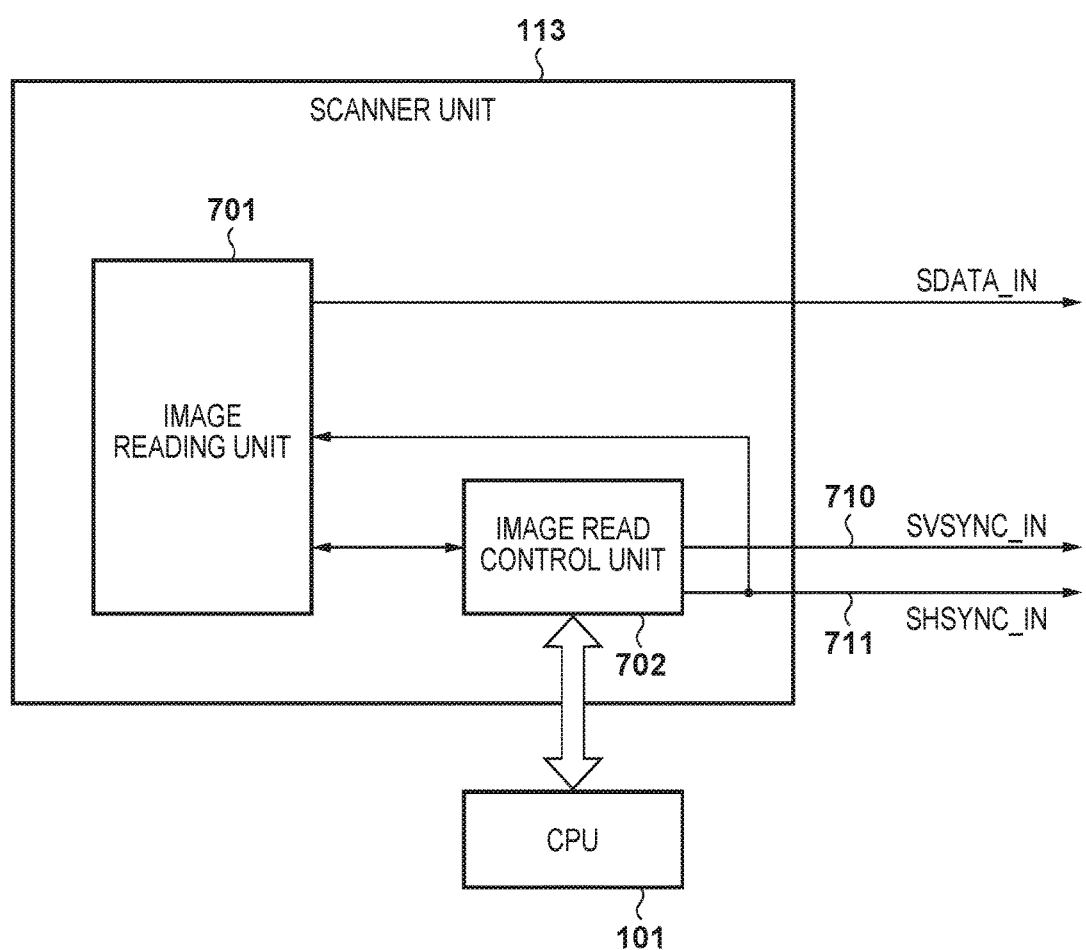
FIG. 10 is a block diagram of a scanner unit according to an embodiment.

Next, with reference to FIG. 10, explanation is given regarding a configuration of the scanner unit 113. The scanner unit 113 is provided with an image reading unit 701 and an image read control unit 702.

The image reading unit 701 is a scanner that uses a linear image sensor, and a scan is executed after an original is placed on a flat original platen. At this time it is possible to capture image data inside by using a light source such as a white light or an LED to illuminate light onto the original, and reading a reflected light therefrom by a linear image sensor such as a CCD, a CIS, or a CMOS sensor. The linear image sensor can read one line's worth of image data in a horizontal direction (a main scanning direction), and reading of an image of one page of an original is realized by using a motor to cause the sensor to move in a vertical direction (a sub scanning direction). This is referred to as a pressing plate operation. It is also possible to fix the linear image sensor to a predetermined position, convey the original in a sub scanning direction by causing a document feeder to operate, and cause an operation for reading an image. This is referred to as an ADF operation.

The image read control unit 702 executes a transmission of image data to the system control unit 100 in accordance with control by the image reading unit 701 and a control timing thereof. The image read control unit 702 communicates with the CPU 101, and accepts a scanner activation instruction from the CPU 101. Note that the CPU 101 accepts a scan instruction from a user via the operation unit 107. The image read control unit 702 causes the image reading unit 701 to perform a pressing plate operation or an ADF operation in accordance with the instruction, and uses a read synchronization signal to transmit image data to the system control unit 100 at a predetermined timing.

Transmission of the image data to the system control unit 100 is performed by using two read synchronization signals: an SVSYNC_IN signal 710 and an SHSYNC_IN signal 711 that are recited in FIG. 10. The scanner unit 113 transmits the image data as a SDATA_IN signal while obtaining synchronization with the system control unit 100 in accordance with the read synchronization signals. The SVSYNC_IN signal 710 is a synchronization signal issued at the start of each page of the image data to be read, and is referred to as a vertical synchronizing signal. The SHSYNC_IN signal 711 is a synchronization signal issued at the start of each line of the image data to be read, and is referred to as a horizontal synchronizing signal. By receiving these signals, the system control unit 100 can receive the image data in alignment with the timing at which the scanner unit 113 transmits.

In the case of a pressing plate operation, specifically the SVSYNC_IN signal 710 is issued when the linear image sensor has moved to a pre-start position for image reading (a home position). In addition, in the case of an ADF operation, the SVSYNC_IN signal 710 is issued when an original has moved to an image pre-read position by a document feeder. Note that for detection of a position in each operation a detection sensor is used, or the position is grasped by counting a step number of a motor used for driving in each operation. By this, by the read position and the original overlapping in accordance with the linear image sensor, it becomes possible to appropriately transmit read image data to a system control unit 100 side.

In addition, the linear image sensor of the image reading unit 701 reads one line of image data by a reading element and sequentially outputs it as SDATA_IN from a head pixel, but the SHSYNC_IN signal 711 is issued at the start of the one line. By this, the linear image sensor can grasp a read start/end timing for one line, and an output timing of read image data. The SHSYNC_IN signal 711 is also output to the system control unit 100 side, and, on the system control unit 100 side, it is used as a reference for grasping a reception position of one line of image data.

<Scan Image Processing Unit>

Figure 11:
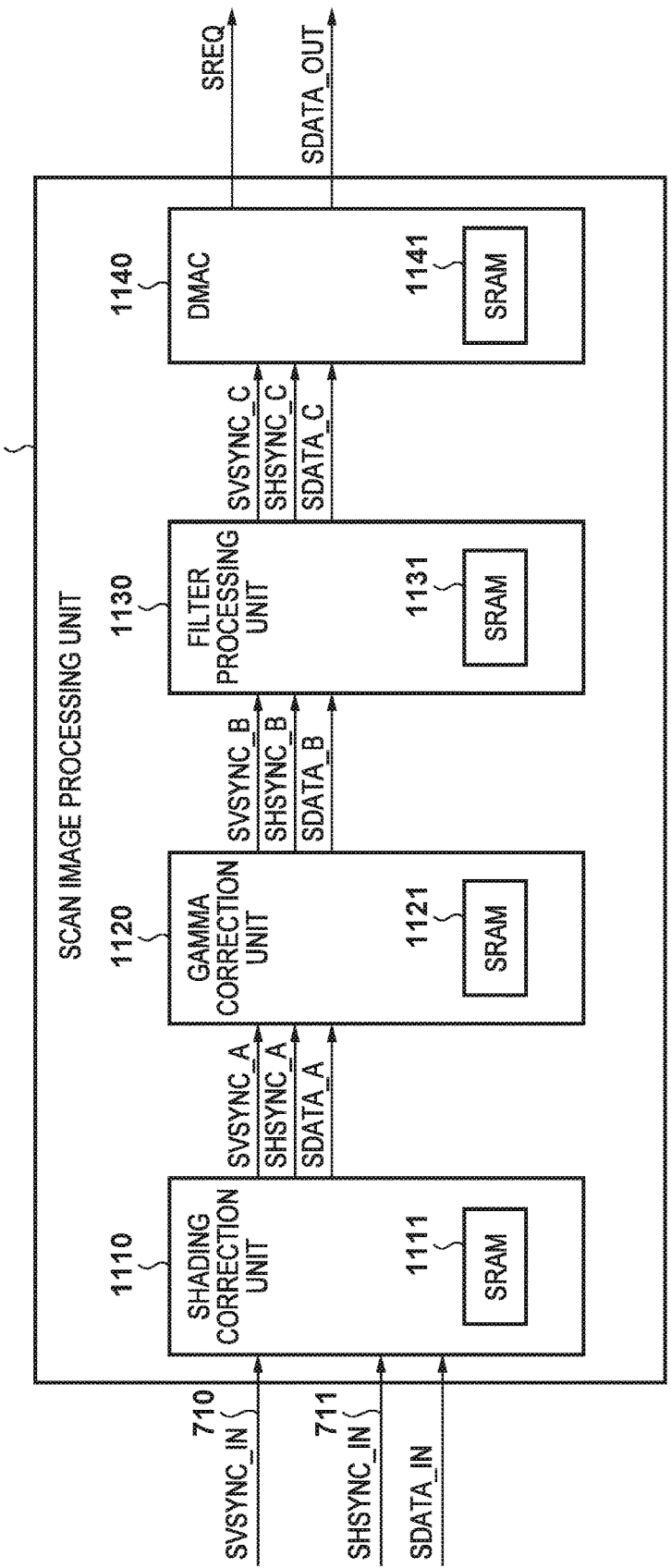
FIG. 11 is a block diagram of a scan image processing unit according to an embodiment.

Next, with reference to FIG. 11, explanation is given regarding a configuration of the scan image processing unit 112. The scan image processing unit 112 is provided with a shading correction unit 1110, a gamma correction unit 1120, a filter processing unit 1130, and a DMAC 1140.

The shading correction unit 1110 performs correction processing with respect to luminance irregularity due to characteristics of an image capturing system or an optical system, to achieve an image with uniform brightness. The correction processing is applied after achieving timing synchronization in accordance with the SVSYNC_IN signal 710 and the SHSYNC_IN signal 711 synchronization signals to obtain the image data SDATA_IN transmitted from the scanner unit 113. Because the luminance irregularity described above differs for each element of the linear image sensor, correction coefficients necessary for the correction differ for each element (in other words each main scanning position). Therefore, for example if a main scanning width is 7200 pixels, 7200 correction coefficients are necessary, so the correction coefficients are commonly stored in an SRAM.

In the shading correction unit 1110, the correction coefficients are stored in an SRAM 1111. The SDATA_IN corrected by using the stored correction coefficients is output to the latter-stage gamma correction unit 1120 as the SDATA_A signal. At this time, a processing delay time occurs from when the SDATA_IN signal is input until the SDATA_A signal is output. The SVSYNC_A signal and the SHSYNC_A signal are designed to be output after having the same processing delay time from the input of the SVSYNC_IN signal 710 and the SHSYNC_IN signal 711. By this, the phase relationship of the three output signals is the same as that of the three input signals.

In the gamma correction unit 1120, a known technique is used with respect to the image data input as SDATA_A to correct a difference of color characteristics between reading elements and the device. The image data to which gamma correction processing has been applied is output to the latter-stage filter processing unit 1130 as SDATA_B. In such a case, the gamma correction is realized by storing a lookup table that draws a correction curve for gamma correction in an SRAM 1121, and referring to it at a time of correction processing. The SVSYNC_B signal, the SHSYNC_B signal, and the SDATA_B signal are output to the latter-stage filter processing unit 1130 after having the same delay time, similarly to for the shading correction unit 1110 described previously.

In the filter processing unit 1130, filtering processing having an objective such as edge emphasis with respect to text or smoothing with respect to a photographic image is executed with respect to RGB data input as SDATA_B, and a processing result is output to the DMAC 1140 as SDATA_C. At this time, it is necessary to refer to a plurality of lines of an image to perform filter processing, and therefore an SRAM 1131 is used as a line buffer. The SVSYNC_C signal, the SHSYNC_C signal, and the SDATA_C signal are output to the latter-stage the DMAC 1140 after having the same delay time, similarly to for the shading correction unit 1110 described previously.

The DMAC 1140 is a direct memory access controller, and issues a request signal SREQ to the DRAM I/F unit 104 when the image data SDATA_C is input from the filter processing unit 1130. The DMAC 1140 transmits read image data SDATA_OUT to the DRAM 105. Note that output of SDATA_OUT being temporarily delayed may occur due to a congestion of instantaneous DRAM access. Therefore, an SRAM 1141 is held internally as a buffer for temporarily accumulating the data input SDATA_C from an upper-stage module (the filter processing unit 1130).

The SRAM present inside each image processing module of the scan image processing unit 112 may be resume SRAM, and has a similar configuration to the SRAM explained by FIG. 5 of the first embodiment described above. Therefore, control relating to transition of the SRAM mode to an RS mode or a normal mode is similar to the details explained by FIG. 6 and FIG. 7 of the first embodiment described above. In addition, as a difference with the first embodiment described above, an SRAM_RS control unit in the resume SRAM can communicate with the RS arbitration unit 115 illustrated in FIG. 9, and details thereof are described later.

<Overall Processing Timing Chart of Scan Image Processing Unit>

Figure 12:
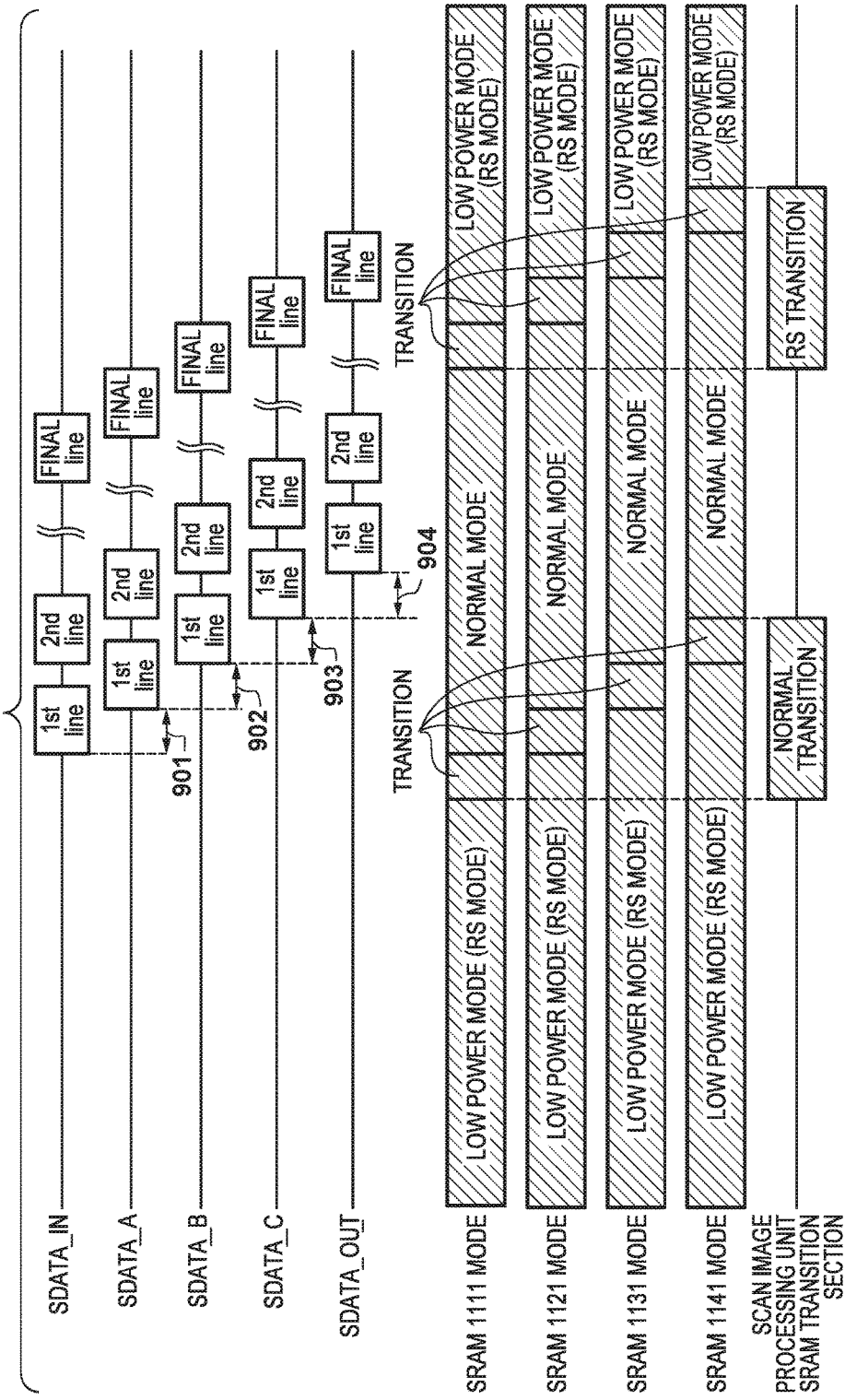
FIG. 12 is a timing chart of a scan image processing unit according to an embodiment.

Next, with reference to FIG. 12, explanation is given regarding timing in relation to data input/output of the shading correction unit 1110, the gamma correction unit 1120, the filter processing unit 1130, and the DMAC 1140 of the scan image processing unit, and transitions of the SRAM mode.

A delay time 901 indicates a delay time due to processing of the shading correction unit 1110, and a delay time 902 indicates a delay time due to processing of the gamma correction unit 1120. A delay time 903 indicates a delay time due to processing of the filter processing unit 1130, and a delay time 904 indicates a delay time due to processing of the DMAC 1140. However, SDATA_OUT indicates a case in which writing can be performed with the fastest performance and where the DRAM is not congested.

An SRAM 1111 mode indicates in relation to transitions of the SRAM mode of the SRAM 1111 which is provided inside the shading correction unit 1110. Transition is made to the normal mode before input of the first line of SDATA_IN to the shading correction unit 1110, and transition is made to the RS mode after output of the final line in accordance with SDATA_A from the shading correction unit 1110.

An SRAM 1121 mode indicates in relation to transitions of the SRAM mode of the SRAM 1121 which is provided inside the gamma correction unit 1120. Similarly, an SRAM 1131 mode indicates in relation to transitions of the SRAM mode of the SRAM 1131 which is provided inside the filter processing unit 1130. Furthermore, an SRAM 1141 mode indicates in relation to transitions of the SRAM mode of the SRAM 1141 which is provided inside the DMAC 1140.

Here, the transition timing of each of the SRAMs 1111, 1121, 1131 and 1141 is delayed in alignment with a delay time of each module, similarly to the print image processing unit 110 of the first embodiment described above. Accordingly, the transition timings of the SRAMs do not overlap for the same interval. However, there is the possibility that the transition timing of any of each SRAM of the scan image processing unit 112 overlaps with the same timing as the transition timing of any of each SRAM of the print image processing unit 110.

In FIG. 12, a section from the first SRAM transition to a final stage SRAM transition is defined as an SRAM transition section of the scan image processing unit, and it is possible to view the total of sections for transitioning as a section for transitioning of the scan image processing unit 112. Here a section for transitioning to the normal mode is shown in the figure as a "normal transition", and a section for transitioning to the RS mode is shown in the figure as an "RS transition".

<RS Arbitration Unit>

Figure 13:
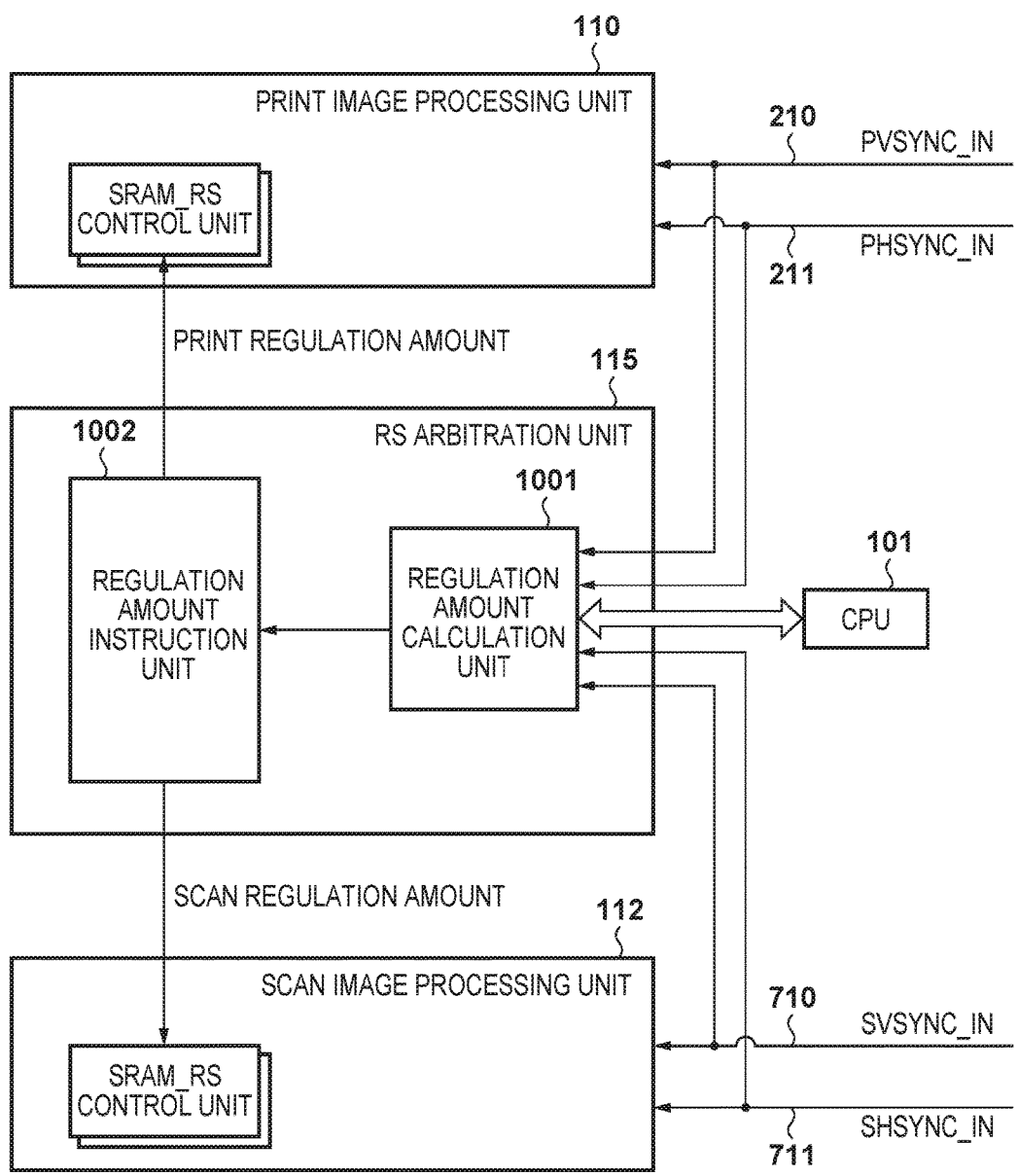
FIG. 13 is a block diagram of an RS arbitration unit according to an embodiment.

For FIG. 13, explanation is given regarding detailed blocks of the RS arbitration unit 115, and connections with the print image processing unit 110 and the scan image processing unit 112. The RS arbitration unit 115 functions as a regulation means, estimates whether transition processing in SRAMs provided in the image processing units overlaps, and shifts the timing of the transition processing in one image processing unit if overlapping is estimated. The RS arbitration unit 115 is provided with a regulation amount calculation unit 1001 and a regulation amount instruction unit 1002 inside an SRAM, and instructs a regulation amount for shifting a transition timing of an SRAM mode with respect to either of the print image processing unit 110 or the scan image processing unit 112.

The regulation amount calculation unit 1001 is a block for calculating by how much it is sufficient to regulate either of the print image processing unit 110 or the scan image processing unit 112. In relation to a computation method, an explanation is given using FIG. 14.

The regulation amount calculation unit 1001, in accordance to a setting from the CPU 101, stores a period (a section from a Low pulse until the next Low pulse) ph_w of the PHSYNC_IN signal 211 in advance. Furthermore, in relation to the SRAM transition sections of the print image processing unit 110 that are illustrated by FIG. 8, a normal transition section width pn_w and a section pn_start from a Low pulse to a normal transition of the PVSYNC_IN signal 210 are stored. Similarly, a normal transition section width pr_w and a section pr_start from a Low pulse to an RS transition of the PVSYNC_IN signal 210 are stored. Regarding details of each section, they are as recited in FIG. 14.

Similarly, the regulation amount calculation unit 1001, by a setting from the CPU 101, stores a period sh_w of the SHSYNC_IN signal 711 in advance. Furthermore, in relation to the SRAM transition sections of the scan image processing unit 112 that are illustrated in FIG. 12, a normal transition section width sn_w and a section sn_start from a Low pulse to a normal transition of the SVSYNC_IN signal 710 are stored. Similarly, a normal transition section width sr_w and a section sr_start from a Low pulse to an RS transition of the SVSYNC_IN signal 710 are stored. Regarding details of each section, they are as recited in FIG. 14.

FIG. 14 recites as an example a case in which the scanner unit 113 is activated first, the SVSYNC_IN signal 710 is input, the printer unit 111 is activated thereafter, and the PVSYNC_IN signal 210 is input. At this time, as illustrated in FIG. 14, a section for transitioning overlaps with an SRAM transition section of the scan image processing unit 112 at an SRAM transition section of the print image processing unit 110 (before arbitration). A section from when the SVSYNC_IN signal 710 is input until when the PVSYNC_IN signal 210 is input is given as spv_w.

When SRAM transition sections overlap in this way between a scan side and a print side, the regulation amount calculation unit 1001 executes regulation processing with respect to a side that was activated later (where VSYNC_IN is input later). Note that the regulation processing regulates a normal transition in a forward direction by the time axis, regulates an RS transition in a backward direction, configures so that there is no change in an execution section of image processing, and regulates so that print speed and a scan speed do not deteriorate.

Firstly, explanation is given regarding regulation on a normal transition side. When the SVSYNC_IN signal 710 is input, the regulation amount calculation unit 1001 causes an internal counter (not shown) to operate, and obtains the section width spv_w until the PVSYNC_IN signal 210 is input. When the PVSYNC_IN signal 210 is input, it is possible to calculate a section from the SVSYNC_IN signal 710 until the start of a normal transition of the print side before arbitration, as spv_w+pn_start. Furthermore, it is possible to calculate a section until the normal transition of the print side terminates as spv_w+pn_start+pn_w.

By comparing this calculation result with a result of calculating a section from sn_start to sn_start+sn_w of the scan side, it is possible to predict in advance an overlap of transitions. If it is determined that "there is overlapping" by the comparison, a transition timing is sped up until the overlapping is resolved. In other words, a timing for one memory module to return from the power saving mode to a normal mode is sped up. Specifically, the width ph_w is successively subtracted from the aforementioned calculation result, and whether the overlapping is resolved is checked. FIG. 14 illustrates an example in which the overlapping is resolved by subtracting one line (in other words one ph_w width). This is illustrated in FIG. 14 as a normal transition regulation amount 1101.

The regulation amount calculation unit 1001 passes to the regulation amount instruction unit 1002 a computation result of subtracting one line for the print image processing unit side with respect to a normal transition. The regulation amount instruction unit 1002 makes an instruction for a print regulation amount as an instruction for subtracting one line from the normal transition timing, with respect to the SRAM_RS control unit 502 of the print image processing unit 110. The print image processing unit 110 controls the transition of the SRAM mode in consideration of the regulation amount indicated with respect to a predetermined number of a counter inside the SRAM_RS control unit 502.

Firstly, explanation is given regarding regulation on an RS transition side. When the PVSYNC_IN signal 210 is input, it is possible to calculate a section from the SVSYNC_IN signal 710 until the start of an RS transition of the print side before arbitration, as spv_w+pr_start. Furthermore, it is possible to calculate a section until the RS transition of the print side terminates as spv_w+pr_start+pr_w.

By comparing this calculation result with a result of calculating a section from sr_start to sr_start+sr_w of the scan side, it is possible to predict in advance an overlap, even with regard to an RS transition.

If it is determined that "there is overlapping" by the comparison, a transition timing is delayed until the overlapping is resolved. In other words, a timing for one memory module to transition from the normal mode to the power saving mode is delayed. Specifically, the width ph_w is successively added to the aforementioned calculation result, and whether the overlapping is resolved is checked. FIG. 14 illustrates an example in which the overlapping is resolved by adding two lines (in other words two ph_w widths). This is illustrated in FIG. 14 as an RS transition regulation amount 1102.

The regulation amount calculation unit 1001 passes to the regulation amount instruction unit 1002 a computation result of adding two lines for the print image processing unit side with respect to an RS transition. The regulation amount instruction unit 1002 makes an instruction for a print regulation amount as an instruction for adding two lines to the RS transition timing, with respect to the SRAM_RS control unit 502 of the print image processing unit 110. The print image processing unit 110 controls the transition of the SRAM mode in consideration of the regulation amount indicated with respect to a predetermined number of a counter inside the SRAM_RS control unit 502.

In the present embodiment, explanation was given of a case in which the printer unit 111 is activated after activation of the scanner unit 113, but if the scanner unit 113 is activated after the printer unit 111, a similar regulation calculation is executed with respect to an SRAM transition section of the scan image processing unit 112. A scan regulation amount is instructed with respect to an SRAM_RS control unit inside the scan image processing unit 112 from the regulation amount instruction unit 1002.

Note that, if the editing image processing unit 114 that operates asynchronously with the scanner unit 113 and the printer unit 111 has a resume SRAM, it is desirable to control by a CPU such that a desired transition is caused to complete before activating a device such as a scanner unit or a printer unit. In this way, it is possible to configure such that overlapping of a transition with the scan image processing unit 112 or the print image processing unit 110 that operate synchronized with the device does not occur.

As explained above, in the present embodiment, even if a plurality of devices (the scanner unit and the printer unit) respectively operate asynchronously, it is possible to use the RS arbitration unit 115 to control so that transition of resume SRAM in respective image processing blocks do not overlap. By this, it is possible to avoid a rush current (inrush current) problem (a problem where guaranteeing an operation in low-voltage operation is difficult) that arises when SRAMs having large capacities are caused to return to a normal mode from an RS mode at the same time.

Third Embodiment

Below, explanation will be given for a third embodiment of the present invention. In the present embodiment, an image processing position for the sub scanning direction and the main scanning direction is distinguished, and control is performed to cause the SRAM core 501 to operate in the normal mode only at a position where image processing is to be performed, and set it to the RS mode for other positions where image processing is not to be performed. By this, it is possible to further reduce power consumption.

<Processing Timing of Print Image Processing Unit>

Firstly, with reference to FIGS. 15A and 15B, explanation is given regarding processing timing of the print image processing unit 110 according to the present embodiment. Here, explanation is given regarding an input/output timing chart of the color space conversion unit 310, as an example.

Reference numeral 1500 of FIG. 15A indicates a timing chart for the print image processing unit 110 that performs a one page output for an image. The PVSYNC_A signal is the PVSYNC_IN signal 210 which is a vertical synchronizing signal issued by the printer unit 111 at a predetermined timing, and is input via the DMAC 300. This signal is issued at the start of an image (page), and is a Low active signal. When this signal becomes Low, the image data is input after a predetermined timing.

The PHSYNC_A signal is the PHSYNC_IN signal 211 which is a horizontal synchronizing signal issued by the printer unit 111 at a predetermined timing, and is input via the DMAC 300. This signal is issued at the start of each line of image data, and is a Low active signal. When this signal becomes Low, one line of image data is input after a predetermined timing.

Here, a number of lines (a number of Low pulses of the PHSYNC_A signal) after the PVSYNC_A signal becomes Low until the first line of data is input is shown in the figure as a leading edge width 1501. In other words, it indicates a width after the PVSYNC_A signal has becomes Low until a first line in an effective image region for which image processing is actually going to be performed. The leading edge width 1501 is decided in accordance with a position of the detection sensor explained by FIG. 2. In addition, a number of lines from when the PVSYNC_A signal becomes Low until input of the first page of the image completes is shown in the figure as a trailing edge width 1502. Note that the trailing edge width 1502 is the leading edge width 1501+an effective line width.

The reference numeral 1510 of FIG. 15B indicates a timing chart for outputting one line of an image. It is a timing chart for illustrating details of an output timing for the first line of reference numeral 1500. A number clock cycles from when the PHSYNC_A signal has becomes Low until a first pixel of data that is an image output start position is input is shown in the figure as a LEFT_MARGIN 1503. Specifically, the LEFT_MARGIN 1503 indicates the position of a head pixel (an image output start position) of each line to be finally output to the printer unit 111.

A HENB_LENGTH 1504 indicates an image width for one line. For example, if a number of pixels to process for the color space conversion unit 310 is 5000 pixels, HENB_LENGTH is 5000. A HSYNC width 1505 indicates a number of clock cycles that indicates an interval for the PHSYNC_A signal. The HSYNC width 1505 is a width that is uniquely determined in accordance with the scanning speed of the halftone unit of the image forming unit 201 of the printer unit 111.

A RIGHT_MARGIN 1506 indicates a number of clock cycles from when the final pixel of one line of an image is input until the PHSYNC_A signal is next input. The RIGHT- _MARGIN 1506 can be calculated by using the HSYNC width 1505−(the LEFT_MARGIN 1503+the HENB_LENGTH 1504).

<Print Image Processing Unit Details>

Figure 16:
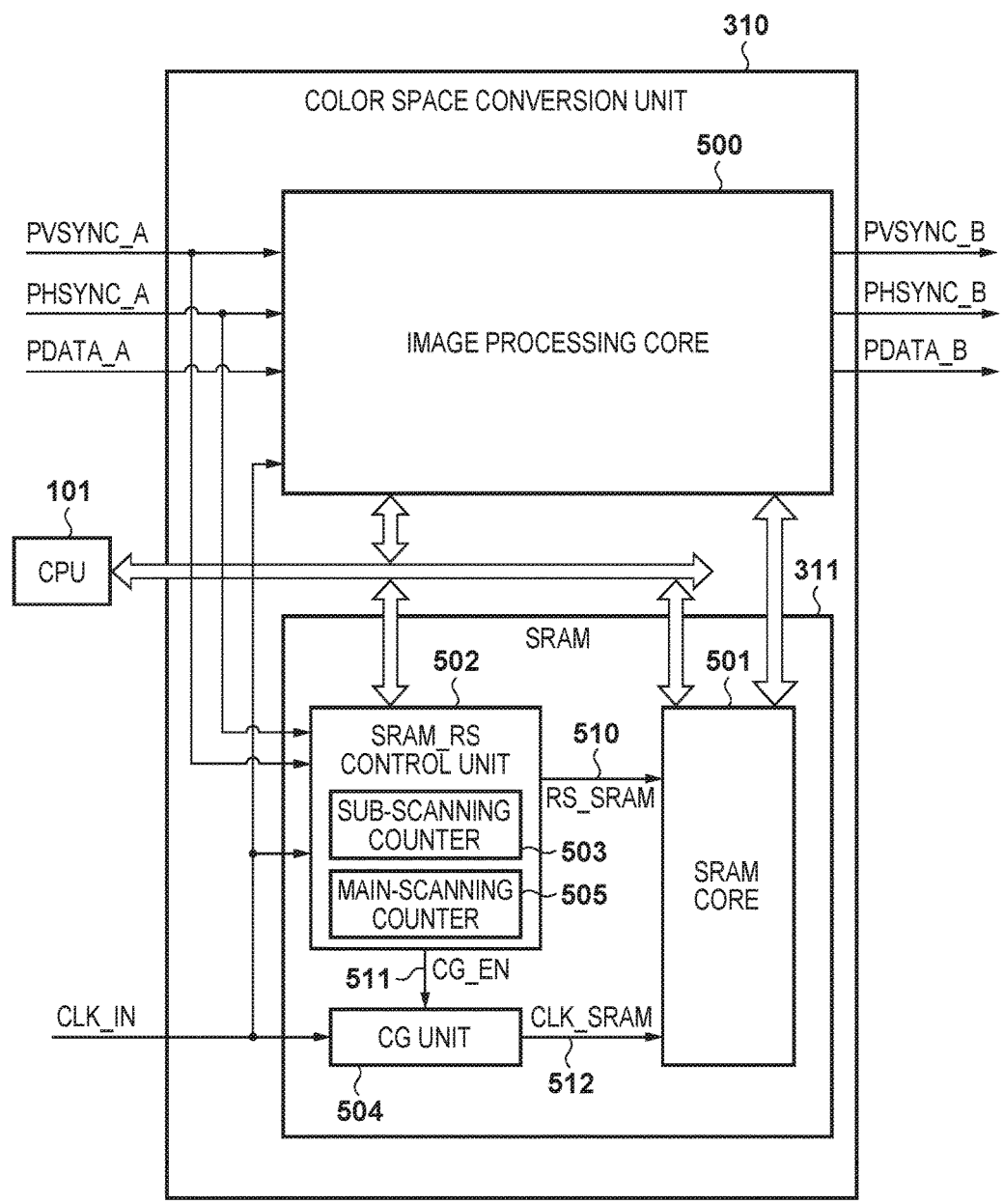
FIG. 16 is a block diagram of a color space conversion unit according to an embodiment.

Next, with reference to FIG. 16, explanation is given regarding a configuration of each image processing unit in the print image processing unit. Here, explanation is given regarding a block diagram of the color space conversion unit 310, as an example. Explanation is given here mainly regarding differences with FIG. 5.

In the color space conversion unit 310 according to the present embodiment, a sub-scanning counter 503 and a main scanning counter 505 are provided as counters. The sub-scanning counter 503 is similar to the counter 503 illustrated in FIG. 5.

The sub-scanning counter 503 is a counter for counting a number of Low pulses of the PHSYNC_A signal from when the Low pulse of the PVSYNC_A signal is input. Meanwhile, the main scanning counter 505 is a counter that counts a number of clock cycles by the CLK_IN signal from when a Low pulse of the PHSYNC_A signal is input.

In a method for controlling the RS_SRAM signal 510 and the CLK_SRAM signal 512, firstly a number of Low pulses of the PHSYNC_A signal is counted by the sub-scanning counter 503 from when a Low pulse of the PVSYNC_A signal is input. Furthermore, an image processing position (units of lines) in the sub scanning direction illustrated by reference 1500 is detected.

Next, a number of clock cycles from when a Low pulse of the PHSYNC_A signal is input is counted by the main scanning counter 505, and an image processing position (units of pixels) in the main scanning direction illustrated by reference numeral 1510 is detected. The RS_SRAM signal 510 and the CG_EN signal 511 are controlled so that the SRAM core 501 operates in a normal mode only for image processing positions to be processed that have been detected in the sub scanning direction and the main scanning direction. In such a case, count predetermined numbers that are threshold values for transitioning to the normal mode and transitioning to the RS mode are calculated by the CPU 101 with consideration given to a section for transitioning, and are set to registers (not shown) of the SRAM_RS control unit 502. Regarding a method of calculating these threshold values, explanation is given later using FIG. 18B.

In addition, there are cases in which it is necessary to write a conversion coefficient to SRAM in advance before image processing as in color space conversion. In such a case, a configuration that can forcibly set the SRAM core to the normal mode (set the RS_SRAM signal 510 to Low) via the CPU 101, and write desired data from the CPU 101 to the SRAM core 501 is taken. The RS mode is returned to after the completion of the writing in accordance with the CPU 101.

The CG unit 504 controls whether to transfer the CLK_IN signal to the CLK_SRAM signal 512 unchanged or whether to cause supply of the clock to stop, in accordance with the logic of the CG_EN signal 511. In detail, if the CG_EN signal 511 is High, the CLK_SRAM signal 512 is stopped, and if the CG_EN signal 511 is Low, the CLK_IN signal is transferred to the CLK_SRAM signal 512 unchanged.

Note that, in this module, a color space conversion coefficient is stored in the memory array portion of the SRAM core. Other image processing modules basically also store coefficients for achieving image processing or image data as a line buffer for referring to a plurality of lines, and have a similar configuration to the present block diagram. A detailed control timing chart of the SRAM_RS control unit 502 is explained later with reference to FIG. 18B.

<SRAM Mode Transition Timing>

Next, with reference to FIG. 17, explanation is given regarding detailed timing regarding a transition specification of the SRAM modes of the SRAM core 501. Firstly, explanation is given regarding a specification in a case of transitioning the SRAM core 501 from the RS mode to a normal mode.

To cause the SRAM core 501 to transition to the normal mode at the time t60, firstly the RS_SRAM signal 510 is controlled to Low. After a t_out interval has elapsed after setting the RS_SRAM signal 510 to Low, it is necessary to input the CLK_SRAM signal 512. The interval for t_out is set as a normal mode transition interval 1701. For the normal mode transition interval 1701, the interval is decided in accordance with a storage capacity of the SRAM core 501, and the interval lengthens as the storage capacity increases. The SRAM core 501 enters a normal mode at a point where the CLK_SRAM signal 512 is next input after the RS_SRAM signal becomes Low and the normal mode transition interval 1701 has elapsed.

Next, explanation is given regarding a specification in a case of transitioning the SRAM core 501 from a normal mode to the RS mode. To cause the SRAM core 501 to transition to the RS mode at the time t62, the CLK_SRAM signal 512 is stopped. The CLK_SRAM signal 512 is stopped, and the RS_SRAM signal is set to High after a t_in interval has elapsed. The interval for t_in is set as an RS mode transition interval 1702. For the RS mode transition interval 1702, the interval is decided in accordance with a storage capacity of the SRAM core 501, and the interval lengthens as the storage capacity increases. The RS mode is entered at a point in time when the RS_SRAM signal is controlled to High after the CLK_SRAM signal 512 has stopped and the RS mode transition interval 1702 has elapsed.

<Control Timing of SRAM Mode at Time of Print Processing>

Figure 18B:
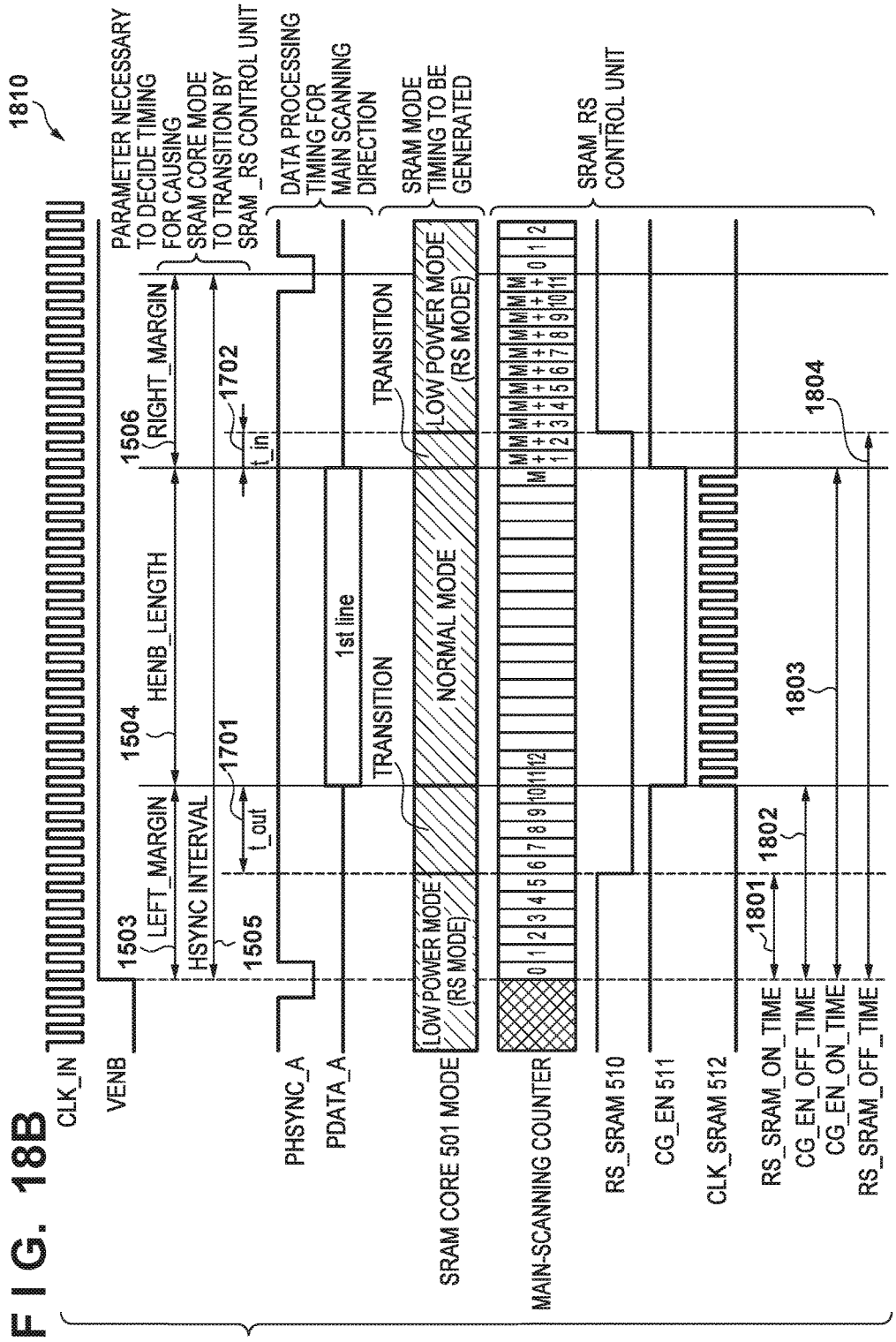

Next, explanation is given regarding timing at which the SRAM_RS control unit 502 controls the SRAM mode, in FIGS. 18A and 18B. Here, explanation is given regarding a timing chart of the color space conversion unit 310, as an example.

A reference numeral 1800 indicates a timing chart for the SRAM_RS control unit 502 to distinguish an image processing region in the sub scanning direction. When the Low pulse of the PVSYNC_A signal is input to the color space conversion unit 310, the internal sub-scanning counter 503 is cleared to zero. Thereafter, each time the Low pulse of the PHSYNC_A signal is input (each line), "+1" is added to the sub-scanning counter 503.

Next, giving attention to the PDATA_A signal, in the present example data for the first line is input when the value of the sub-scanning counter 503 indicates 3. In other words, the leading edge width 1501 of FIG. 15A is three lines. In addition, data for the final line has been input when the value of the sub-scanning counter 503 indicates N. In other words, a section in which the sub-scanning counter 503 is from 3 to N is an image processing position in the sub scanning direction, and control by the SRAM_RS control unit 502 is performed so that a VENB signal is High during this section. The VENB signal when it is High indicates an interval in which image processing in the sub scanning direction is being performed and when it is Low indicates an interval in which image processing in the sub scanning direction is not being performed.

By generating the VENB signal in this way, the CPU 101 sets registers (not shown) of the SRAM_RS control unit 502, setting a threshold value for setting the VENB signal to High to 3, and setting a threshold value for setting the VENB signal to Low to N. The SRAM_RS control unit 502 generates the VENB signal in accordance with the set threshold values.

A reference numeral 1810 indicates a timing chart for the SRAM_RS control unit 502 to distinguish an image processing region in the main scanning direction and to control the SRAM mode. It is a timing chart for illustrating details of an interval for the first line of reference numeral 1800.

When the Low pulse of the PHSYNC_A signal is input to the color space conversion unit 310, the internal main scanning counter 505 is cleared to zero. It is incremented by +1 in accordance with a CLK_IN signal until the next Low pulse of the PHSYNC_A signal is inputted.

RS_SRAM_ON_TIME 1801 indicates after how many cycles after a Low pulse of the PHSYNC_A signal is received the RS_SRAM signal 510 is to be set to Low. CG_EN_OFF_TIME 1802 indicates after how many cycles after a Low pulse of the PHSYNC_A signal is received the CG_EN signal 511 is to be set to Low. CG_EN_ON_TIME 1803 indicates after how many cycles after a Low pulse of the PHSYNC_A signal is received the CG_EN signal 511 is to be set to High. RS_SRAM_ON_TIME 1804 indicates after how many cycles after a Low pulse of the PHSYNC_A signal is received the RS_SRAM signal 510 is to be set to High.

While the VENB signal is High, the SRAM_RS control unit 502 compares the register values indicating the count numbers of the aforementioned 1801 to 1804 with the value of the main scanning counter 505, and controls the RS_SRAM signal 510 and the CG_EN signal 511.

From here, an explanation is given regarding a method of calculating the count numbers of the aforementioned 1801 to 1804. Calculation of these count numbers is executed by the CPU 101 before initiation of print image processing, and set to registers of the SRAM_RS control unit 502.

The RS_SRAM_ON_TIME 1801 is calculated by the LEFT_MARGIN 1503–the normal mode transition interval 1701. The CG_EN_OFF_TIME 1802 is calculated by the LEFT_MARGIN 1503. The CG_EN_ON_TIME 1803 is calculated by the LEFT_MARGIN 1503+the HENB_LENGTH 1504. The RS_SRAM_ON_TIME 1804 is calculated by the LEFT_MARGIN 1503+the HENB_LENGTH 1504+the RS mode transition interval 1702.

If the LEFT_MARGIN 1503–the normal mode transition interval 1701 is negative, the RS_SRAM signal 510 is controlled by the SRAM_RS control unit 502 to remain High. Meanwhile, if the RIGHT_MARGIN 1506–the RS mode transition interval 1702 is negative, the CG_EN signal 511 is controlled by the SRAM_RS control unit 502 to remain Low. As a reason, this is because intervals for transitioning the SRAM mode to a normal mode cease to fit at the image processing position.

However, basically it is not the case that the LEFT_MARGIN 1503–the normal mode transition interval 1701 or the RIGHT_MARGIN 1506–the RS mode transition interval 1702 will become negative values. As a reason, this is because, whereas the LEFT_MARGIN 1503 and the RIGHT_MARGIN 1506 are typically several tens of cycles to several thousands of cycles, the normal mode transition interval 1701 and the RS mode transition interval 1702 are not even several cycles (mainly approximately one cycle).

As explained above, in the present embodiment, based on synchronization signals of a device such as a printer unit, transition control to a normal mode or the RS mode of the resume SRAM is performed. By controlling in this way, it is possible to cause power consumption of resume SRAM inside an image processing circuit that operates in synchronization with the synchronization signals to be reduced. In addition, by performing control of the resume SRAM for transitioning to the normal mode or the RS mode without going through the CPU, it is possible to perform transition control at an accurate timing for minimizing power consumption.

In more detail, it is possible to reduce power consumption without limitation by distinguishing an image processing position for the sub scanning direction and the main scanning direction, causing the SRAM core 501 to operate in the normal mode only at a position where image processing is to be performed, and setting to the RS mode for other positions where image processing is not to be performed. As a comparative example, if the resume SRAM is caused to be controlled without going through the CPU, the resume SRAM is set to the normal mode before activation of the printer unit 111. This means that the normal mode is entered before conveyance of a recording medium by the printer unit 111 starts, and the normal mode is wastefully entered for a long interval (several seconds). Typically the RS mode has power consumption of approximately 40% of the normal mode, and furthermore, in conjunction with improvements in image quality of image forming apparatuses in recent years, the capacity of SRAM that is mounted for image processing internally is increasing. Accordingly, accordingly, transition control of resume SRAM as in the present embodiment can cause a proportion of SRAM power consumption in a system to be greatly reduced. Note that explanation was given in the present embodiment by taking a printer as a device side example, but with regards to a scanner it is also possible to similarly cause power consumption of resume SRAM to be reduced by performing transition control of the resume SRAM based on synchronization signals between the scanner and the system.

Fourth Embodiment

Below, explanation will be given for a fourth embodiment of the present invention. Incidentally, if the capacity of an SRAM that has an RS mode in the chip increases, accordingly there is a problem in that a peak current of a rush current (inrush current) for when returning from the RS mode to a normal mode increases, and a guarantee of data retention in a low-voltage operation becomes difficult. Accordingly, in the present embodiment, explanation is given regarding a method of handling a chip that needs rush current countermeasures and has a plurality of SRAMs that have an RS mode.

<Print Image Processing Unit Details>

Firstly, with reference to FIG. 19, explanation is given regarding a configuration of the print image processing unit 110 according to the present embodiment. Here, explanation is given only regarding differences with FIG. 3 and FIG. 16.

A color space conversion unit 820 is the same as the color space conversion unit 310 in a point of comprising the image processing core 500 and the SRAM core 501. Differences are functions corresponding to the SRAM_RS control unit 502 and the CG unit 504 inside the color space conversion unit 310 of FIG. 16, and a point in that signals corresponding to the RS_SRAM signal 510 and the CLK_SRAM signal 512 are arranged outside of the color space conversion unit 310. While the processing details and SRAM core sizes of the image processing core are different for a filter processing unit 830 and a halftone unit 840, configurations thereof are similar to that of the color space conversion unit 820.

An SRAM_RS control unit 802 controls an RS_SRAM_A signal 852, an RS_SRAM_B signal 853, and an RS_SRAM_C signal 854 that are RS_SRAM signals in the SRAM core of each image processing unit. Furthermore, the SRAM_RS control unit 802 controls an CG_EN_A signal 805, a CG_EN_B signal 806, and a CG_EN_C signal 807 that are CG_EN signals to CG units 810, 811 and 812 for controlling a CLK_SRAM signal of the SRAM core of each image processing unit.

A sub-scanning counter 803 and a main scanning counter 804 have a similar specification to that of the sub-scanning counter 503 and the main scanning counter 505 of FIG. 16, so explanation thereof is omitted. The CG units 810, 811, and 812 have a similar specification to that of the CG unit 504 of FIG. 16. The CG units 810, 811, and 812 control, in accordance with respective values of the CG_EN signals 805, 806, and 807, a CLK_IN signal to a CLK_SRAM_A signal 862, a CLK_SRAM_B signal 863, and a CLK_SRAM_C signal 864 that are connected to respective SRAM cores.

Similarly to the third embodiment described above, the SRAM_RS control unit 802 causes each SRAM core to transition to the normal mode at a position for performing print image processing. Furthermore, the SRAM_RS control unit 802 controls the RS_SRAM_A signal 852, the RS_SRAM_B signal 853, the RS_SRAM_C signal 854, the CG_EN_A signal 805, the CG_EN_B signal 806, and the CG_EN_C signal 807 in consideration of rush currents.

A detailed control timing chart of the SRAM_RS control unit 802 is explained later with reference to FIG. 20A, FIGS. 20B-1, and 20B-2. Note that, although it is not shown graphically, the CLK_IN signal is unsurprisingly connected to the color space conversion unit 820, the filter processing unit 830, and the halftone unit 840.

<Control Timing of SRAM Mode at Time of Print Processing>

Figure 20A:
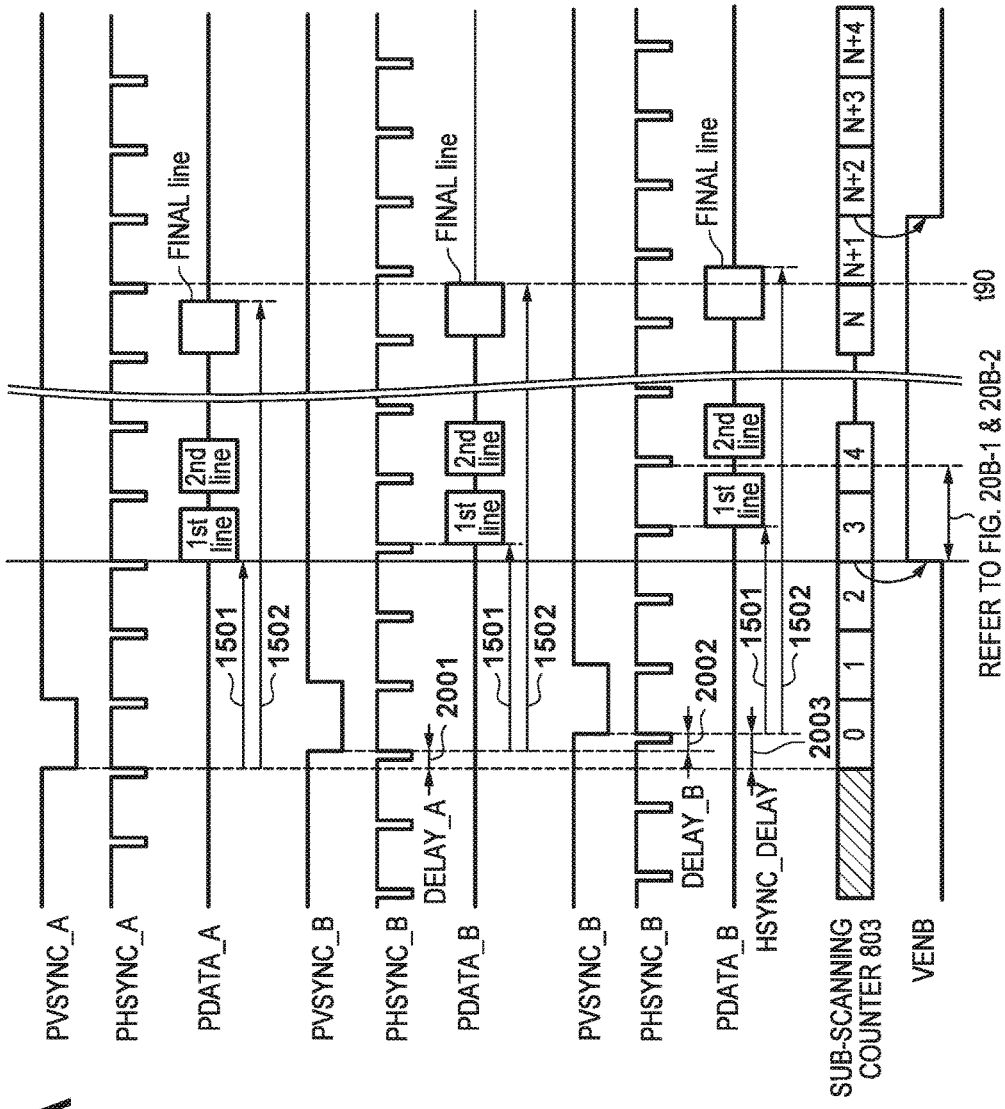

With reference to FIG. 20A, FIGS. 20B-1, and 20B-2, explanation is given regarding timing at which the SRAM_RS control unit 802 in the present embodiment controls the SRAM modes. FIG. 20A indicates a timing chart for the SRAM_RS control unit 802 to distinguish an image processing region in the sub scanning direction. Firstly, explanation is given regarding processing timing of each image processing unit in the print image processing unit 110 that is connected to the pipeline.

DELAY_A 2001 indicates a delay of a predetermined amount incurred in image processing by the color space conversion unit 820. In addition, the PVSYNC_B, PHSYNC_B, and PDATA_B signals, are respectively the PVSYNC_A, PHSYNC_A, and the PDATA_A signals which are output with a predetermined amount of delay. At this time, image processing by the color space conversion unit 820 is applied to PDATA_B, and the aforementioned predetermined amount of delay is the delay time incurred for this color space conversion processing.

Similarly, DELAY_B 2002 indicates a delay time incurred in image processing by the filter processing unit 830. HSYNC_DELAY 2003 indicates a delay time incurred in image processing by all image processing units in the print image processing unit 110. In other words, in the present embodiment, it is an addition result of the DELAY_A 2001 and the DELAY_B 2002.

Next, explanation is given regarding timing for distinguishing an image processing region in the sub scanning direction in the print image processing unit 110 that is connected to the pipeline. In particular, explanation is given for differences with the generation method using the VENB signal explained by reference numeral 1800.

At reference numeral 1800, a section where the sub-scanning counter 503 is from 3 to N was set as the image processing position in the sub scanning direction, but in FIG. 20A the SRAM_RS control unit 802 performs control such that a section where the sub-scanning counter 803 is from 3 to N+1 becomes the image processing position in the sub scanning direction. As a reason, this is because the delay of the HSYNC_DELAY 2003 is present for the image processing units of the print image processing unit 110. This is because, hypothetically if the VENB signal is caused to transition at a timing t90, although processing of the color space conversion unit 820 has finished, there is the possibility that processing of the filter processing unit 830 and the halftone unit 840 has not finished. That is, the SRAM_RS control unit 802 controls so as to set the VENB signal to High only in a minimum interval in which all image processing units in the print image processing unit 110 can perform the image processing from the leading line until the final line.

Figures 1, 20B:
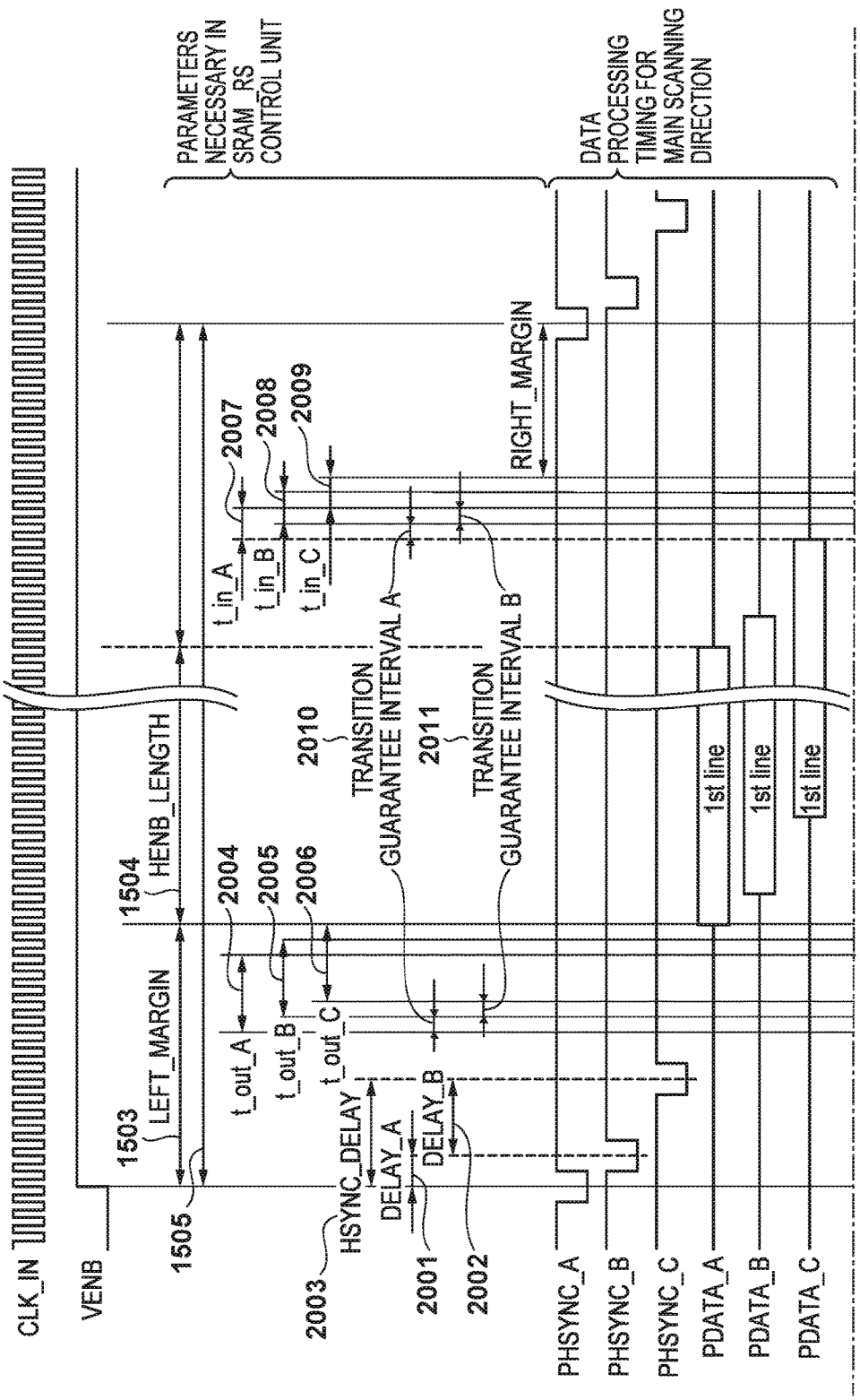

FIGS. 20B-1 and 20B-2 indicate timing charts for the SRAM_RS control unit 502 to distinguish an image processing region in the main scanning direction and to control the SRAM mode. It is a timing chart for illustrating details of an interval for the first line of FIG. 20A.

t_out_A is a normal mode transition interval 2004 of the SRAM core 501 of the color space conversion unit 820. t_out_B is a normal mode transition interval 2005 of an SRAM core 831 of the filter processing unit 830. t_out_C is a normal mode transition interval 2006 of an SRAM core 841 of the halftone unit 840. t_in_A is an RS mode transition interval 2007 of the SRAM core 501 of the color space conversion unit 820. t_in_B is an RS mode transition interval 2008 of the SRAM core 831 of the filter processing unit 830. t_in_C is an RS mode transition interval 2009 of the SRAM core 841 of the halftone unit 840.

Regarding definitions of the normal mode transition interval and the RS mode transition interval, it is the same as the normal mode transition interval 1701 and the RS mode transition interval 1702 explained by FIG. 17. Because the size of the SRAM cores in the image processing units differs, there is the possibility that the normal mode transition interval and the RS mode transition interval differ.

A transition guarantee interval A 2010 and a transition guarantee interval B 2011 are intervals necessary to prevent rush currents in a case where the SRAM core 501, the SRAM core 831, the SRAM core 841 transition to a normal mode or the RS mode. If the intervals of the transition guarantee interval A 2010 and the transition guarantee interval B 2011 are not shifted and the SRAM cores 501, 831 and 841 are caused to transition to a normal mode or the RS mode at the same time, a peak current for a rush current increases, and holding data becomes difficult. Accordingly, there is a need to perform control by the SRAM_RS control unit 802 such that the intervals of the transition guarantee interval A 2010 and the transition guarantee interval B 2011 are shifted and the SRAM cores 501, 831 and 841 transition to a normal mode or the RS mode.

RS_SRAM_ON_TIME 2021, 2031, and 2041; CG_EN_OFF_TIME 2022, 2032, and 2042; CG_EN_ON_TIME 2023, 2033, and 2043; and RS_SRAM_ON_TIME 2024, 2034, and 2044 have similar definitions to the RS_SRAM_ON_TIME 1801, the CG_EN_OFF_TIME 1802, the CG_EN_ON_TIME 1803, and the RS_SRAM_ON_TIME 1804 explained by reference numeral 1810.

Reference numerals 2021 to 2024 indicate transition timings of the RS_SRAM_A signal 852 and the CLK_SRAM_A signal 862 which are connected to the SRAM core 501 of the color space conversion unit 820. Reference numerals 2031 to 2034 indicate transition timings of the RS_SRAM_B signal 853 and the CLK_SRAM_B signal 863 which are connected to the SRAM core 831 of the filter processing unit 830. Reference numerals 2041 to 2044 indicate transition timings of the RS_SRAM_C signal 854 and the CLK_SRAM_C signal 864 which are connected to the SRAM core 841 of the halftone unit 840.

Each transition timing (number of cycles of) the reference numerals 2021 to 2044 is calculated by the CPU 101 and set to a register of the SRAM_RS control unit 802. While the VENB signal is High, the SRAM_RS control unit 802 compares the register values indicating the count numbers of the aforementioned 2021 to 2044 with the value of the main scanning counter 804. As a result of the comparison, control is performed of the RS_SRAM_A signal 852, the RS_S-RAM_B signal 853, the RS_SRAM_C signal 854, the CG_EN_A signal 862, the CG_EN_B signal 863, and the CG_EN_C signal 864. Calculation of these count numbers for the aforementioned 2021 to 2044 is executed by the CPU 101 before initiation of print image processing, and set to registers of the SRAM_RS control unit 802.

From here, explanation is given regarding a method of calculating each transition interval. Control that is to be performed by the SRAM_RS control unit 802 is control for all RS_SRAM cores to transition to the normal mode at t91 which is a timing for the first image processing unit in the print image processing unit 110 (the color space conversion unit 820 in the present example) to process the head pixel of each line. Furthermore, it is controlling such that all RS_S-RAM cores start a transition to the RS mode at t92, which is a timing for the final image processing unit of the print image processing unit 110 (the halftone unit 840 in the present example) to process the final pixel of the first line.

Firstly, explanation is given regarding a method of calculating control timings of the RS_SRAM_A signal 852 and the CLK_SRAM_A signal 862 for the SRAM core 501 of the color space conversion unit 820. The RS_SRAM_A_ON_TIME 2021 is calculated by the LEFT_MARGIN 1503−(the maximum transition interval+the transition guarantee interval). The "maximum transition interval" is the maximum value of the normal mode transition interval 2004 of the SRAM core 501, the normal mode transition interval 2005 of the SRAM core 831, and the normal mode transition interval 2006 of the SRAM core 841. The "transition guarantee interval" is the transition guarantee interval A 2010+the transition guarantee interval B 2011.

The CG_EN_A OFF_TIME 2022 is calculated by the LEFT_MARGIN 1503−(the maximum transition interval+the transition guarantee interval)+the normal mode transition interval 2004. The CG_EN_A_ON_TIME 2023 is calculated by the LEFT_MARGIN 1503+the HENB_LENGTH 1504+the HSYNC_DELAY 2003. The RS_SRAM_A OFF_TIME 2024 is calculated by the LEFT_MARGIN 1503+the HENB_LENGTH 1504+the HSYNC_DELAY 2003+the RS mode transition interval 2007.

Next, explanation is given regarding a method of calculating control intervals of the RS_SRAM_B signal 853 and the CLK_SRAM_B signal 863 for the SRAM core 831 of the filter processing unit 830. A way of thinking is to add the interval for the transition guarantee interval A 2010 to the transition timing of the SRAM core 501 of the color space conversion unit 820 and the SRAM core 831 of the filter processing unit 320.

The RS_SRAM_B ON_TIME 2031 is calculated by the LEFT_MARGIN 1503−(the maximum transition interval+the transition guarantee interval)+the transition guarantee interval A 2010. The CG_EN_B OFF_TIME 2032 is calculated by the LEFT_MARGIN 1503−(the maximum transition interval+the transition guarantee interval)+the normal mode transition interval 2005+the transition guarantee interval A 2010. The CG_EN_B ON_TIME 2033 is calculated by the LEFT_MARGIN 1503+the HENB_LENGTH 1504+the HSYNC_DELAY 2003+the transition guarantee interval A 2010. The RS_SRAM_B OFF_TIME 2034 is calculated by the LEFT_MARGIN 1503+the HENB_LENGTH 1504+the HSYNC_DELAY 2003+the RS mode transition interval 2008+the transition guarantee interval A 2010.

Next, explanation is given regarding a method of calculating control intervals of the RS_SRAM_C signal 854 and the CLK_SRAM_C signal 864 for the SRAM core 841 of the halftone unit 840. A way of thinking is to add the interval for the transition guarantee interval B 2011 to the transition timing of the SRAM core 841 of the halftone unit 840 and the SRAM core 831 of the filter processing unit 830.

The RS_SRAM_C ON_TIME 2041 is calculated by the LEFT_MARGIN 1503−(the maximum transition interval+the transition guarantee interval)+(the transition guarantee interval A 2010+the transition guarantee interval B 2011). The CG_EN_C OFF_TIME 2042 is calculated by the LEFT_MARGIN 1503−(the maximum transition interval+the transition guarantee interval)+the normal mode transition interval 2006+(the transition guarantee interval A 2010+the transition guarantee interval B 2011). The CG_EN_C ON_TIME 2043 is calculated by the LEFT_MARGIN 1503+the HENB_LENGTH 1504+the HSYNC_DELAY 2003+(the transition guarantee interval A 2010+the transition guarantee interval B 2011). The RS_SRAM_C OFF_TIME 2044 is calculated by the LEFT_MARGIN 1503+the HENB_LENGTH 1504+the HSYNC_DELAY 2003+the RS mode transition interval 2009+(the transition guarantee interval A 2010+the transition guarantee interval B 2011).

As explained above, even in an image processing unit having a plurality of SRAMs that have an RS mode, image processing positions in the sub scanning direction and the main scanning direction are distinguished while performing rush current countermeasures. By this, it is possible to cause the SRAM core 501 to operate in the normal mode only at a timing for performing image processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-069276 filed on Mar. 30, 2016, which is hereby incorporated by reference herein in its entirety.

What is claimed is:

1. An image reading apparatus, comprising:
a reading unit configured to read an image of an original;
an image processing circuit to which image data read by the reading unit, a vertical synchronization signal, and a horizontal synchronization signal area are inputted, and configured to perform image processing for the image data; and
a memory which is capable of operating in a first power mode and a second power mode in which power consumption is lower than power consumption in the first power mode, and configured to hold the image data that is image processed by the image processing circuit;
wherein the memory counts a number of the horizontal synchronization signals which are inputted to the image processing circuit from the reading unit after the vertical synchronization signal is inputted to the image processing circuit from the reading unit, and executes a transition process from the second power mode to the first power mode upon the counted number reaching a predetermined number.

2. The image reading apparatus according to claim 1, wherein a plurality of memories are provided for each function, and each memory starts the transition processing shifted from each other.

3. The image reading apparatus according to claim 2, wherein each memory starts the transition processing at a timing when an interval corresponding to a processing delay time in a preceding stage memory in a processing order of the image processing has elapsed after the preceding stage memory has started the transition processing.

4. The reading apparatus according to claim 1, wherein the memory is a SRAM included in the image processing circuit, and
wherein the SRAM comprises:
a control circuit which outputs a control signal in accordance with the horizontal synchronization signal from the reading unit; and
a SRAM core which supplies power in accordance with the control signal outputted from the control circuit to an internal memory array, and holds information stored in the memory array.

5. A printing apparatus, comprising:
an image processing circuit that receives image data, a vertical synchronization signal, and a horizontal synchronization signal and performs image processing for inputted image data;
a memory which is capable of operating in a first power mode and a second power mode in which power consumption is lower than power consumption in the first power mode, and configured to hold the image data that is image processed by the image processing circuit; and
a print unit configured to perform printing based on the image data held in the memory,
wherein the member counts a number of the horizontal synchronization signals which are inputted to the image processing circuit from the printing unit after the vertical synchronization signal is inputted to the image processing circuit from the print unit and executes a transition process from the second power mode to the first power mode upon the counted number reaching a predetermined number.

6. The printing apparatus according to claim 5, wherein a plurality of memories are provided for each function, and each memory starts the transition processing shifted from each other.

7. The printing apparatus according to claim 6, wherein each of the plurality of memories starts the transition processing at a timing when an interval corresponding to a processing delay time in a preceding stage memory in a processing order of the image processing has elapsed after the preceding stage memory has started the transition processing.

8. The printing apparatus according to claim 5, wherein the memory is a SRAM included in the image processing circuit, and
wherein the SRAM comprises:
a control circuit which outputs a control signal in accordance with the horizontal synchronization signal from the print unit; and
a SRAM core which supplies power in accordance with the control signal outputted from the control circuit to an internal memory array, and holds information stored in the memory array.

9. An image reading apparatus, comprising:
a reading unit configured to read, line by line, an original of one page;
a volatile memory which is capable of operating in a first power state and in a second power state in which power consumption is lower than power consumption in the first power state, the first power state being capable of holding data and reading out the data, and the second power state being capable of holding data and being not capable of reading out the data;
an image processing circuit configured to process image data obtained by reading the original by the reading unit, accessing the data held in the memory; and
a memory controller configured to control a power state of the memory,
wherein the memory controller shifts the power state of the memory from the first power state to the second power state after inputting of the image data of the last line of the one page to the image processing circuit is completed.

10. The image reading apparatus according to claim 9, wherein the memory controller shifts the power state of the memory from the second power state to the first power state by a time when image data of a first line of next page is inputted after shifting the power state of the memory from the first power state to the second power state.

11. The image reading apparatus according to claim 9, wherein the memory controller shifts the power state of the memory from the first power state to the second power state after a predetermined time period has elapsed since image data of the last line of the one page has been inputted.

12. The image reading apparatus according to claim 9, further comprising:
a reading controller configured to output, to the memory controller, a vertical synchronizing signal indicating that image data of the one page is outputted, and to output, to the memory controller, a horizontal synchronizing signal indicating a head of image data of one line,
wherein the memory controller shifts the power state of the memory controller from the first power state to the second power state based on the number of the horizontal synchronizing signals inputted after inputting the vertical synchronizing signal in the first power state.

13. The image reading apparatus according to claim 12, wherein the vertical synchronizing signal outputted by the reading controller is inputted to the image processing circuit and the memory controller, and
wherein the horizontal synchronizing signal outputted by the reading controller is inputted to the image processing circuit and the memory controller.

14. The image reading apparatus according to claim 12, wherein the memory controller shifts the power state of the memory from the second power state to the first power state based on the number of the horizontal synchronizing signals inputted after inputting the vertical synchronizing signal in the second power state.

15. The image reading apparatus according to claim 12, wherein the reading unit starts to input image data to the image processing circuit after a predetermined time period has elapsed since the reading controller unit has outputted the vertical synchronizing signal, and
wherein the memory controller shifts the power state of the memory from the second power state to the first power state by a time when the inputting of image data is started since the vertical synchronizing signal has been inputted.

16. The image reading apparatus according to claim 12, wherein the memory controller shifts the power state of the memory controller from the first power state to the second power state in accordance with the horizontal synchronizing signal inputted after inputting of the image data of the last line of the one page to the image processing circuit is completed.

* * * * *